US012572660B2

(12) United States Patent
Kuroda et al.

(10) Patent No.:  US 12,572,660 B2
(45) Date of Patent:       Mar. 10, 2026

(54) SECURE SYSTEM AUTOMATIC DESIGN APPARATUS, SECURE SYSTEM AUTOMATIC DESIGN METHOD, AND COMPUTER READABLE MEDIUM

(71) Applicant: NEC Corporation, Tokyo (JP)

(72) Inventors: Takayuki Kuroda, Tokyo (JP); Takuya Kuwahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 18/687,377

(22) PCT Filed: Sep. 14, 2021

(86) PCT No.: PCT/JP2021/033729
§ 371 (c)(1),
(2) Date: Feb. 28, 2024

(87) PCT Pub. No.: WO2023/042257
PCT Pub. Date: Mar. 23, 2023

(65) Prior Publication Data
US 2024/0403429 A1     Dec. 5, 2024

(51) Int. Cl.
*G06F 21/57*          (2013.01)

(52) U.S. Cl.
CPC ........ *G06F 21/57* (2013.01); *G06F 2221/034* (2013.01)

(58) Field of Classification Search
CPC ... G06F 21/57; G06F 2221/034; G06F 21/577
See application file for complete search history.

(56) References Cited

U.S. PATENT DOCUMENTS

2016/0246582 A1 *   8/2016   Benton ..................... G06F 8/61
2021/0240448 A1 *   8/2021   Kuroda ..................... G06F 8/35
2022/0131904 A1 *   4/2022   Wright ................. H04L 63/102

FOREIGN PATENT DOCUMENTS

WO        2019/216082 A1    11/2019
WO        2020/179173 A1     9/2020

OTHER PUBLICATIONS

International Search Report for PCT Application No. PCT/JP2021/033729, mailed on Nov. 22, 2021.
(Continued)

*Primary Examiner* — Beemnet W Dada
(74) *Attorney, Agent, or Firm* — Sughrue Mion, PLLC

(57)          ABSTRACT
A secure system automatic design apparatus includes: an input/output unit that receives an input of a system requirement and output a system configuration; a configuration information concretization unit that converts the system requirement into the system configuration through a plurality of concretization procedures; and a security evaluation unit that evaluates security of the system configuration. In each of the concretization procedures, the configuration information concretization unit generates a plurality of configuration drafts, each of the configuration drafts being configuration information that is being converted and each of the configuration drafts being branched to a plurality of options of a concretization method. The security evaluation unit also evaluates security of each of the configuration drafts generated through the respective procedures. The configuration information concretization unit determines the option to be branched based on a result of the evaluation of each of the configuration drafts by the security evaluation unit.

8 Claims, 22 Drawing Sheets

(56) References Cited

OTHER PUBLICATIONS

Lukas Gressl et al., "Design Space Exploration for Secure IoT Devices and Cyber-Physical Systems", ACM Transactions on Embedded Computing Systems (TECS) vol. 20, No. 4, May 2021.

Takayuki Kuroda et al., "Aquisition of Knowledge about ICT System Designing with Machine Learning", The Transactions of the Institute of Electronics, Information and Communication Engineers, vol. J104-B, No. 3, Mar. 2021.

Takuya Kuwahara et al., "An intent-based system configuration design for IT/NW services with functional and quantitative constraints", IEICE Trans. Commun., vol. E104-B, No. 7, Jul. 2021.

Yoshiaki Isobe et al., "Development of Security Risk Analyzing System based on Dynamically Modeling using the Bayesian Network", IPSJ SIG Technical Report, vol. 2015-CSEC-68, No. 6, Feb. 26, 2015.

Lukas Gressl et al., "Security Driven Design Space Exploration for Embedded Systems", 2019 Forum for Specification and Design Languages (FDL), Sep. 2, 2019.

* cited by examiner

REPRESENTATION EXAMPLE OF CONFIGURATION
INFORMATION IN FORM OF FIGURE

REPRESENTATION EXAMPLE OF CONFIGURATION
INFORMATION IN FORM OF TEXT

```
CONFIGURATION:
    NODE:
        - id: ap1
        TYPE: AP₁
        - id: ap2
        TYPE: AP₂
        - id: vm1
        TYPE: VM
    EDGE:
        - CONNECTION SOURCE: $ap1
        TYPE: ConnTo<AP, AP>
        CONNECTION DESTINATION: $ap2
        - CONNECTION SOURCE: $ap1
        TYPE: HostedOn<*, VM>
        CONNECTION DESTINATION: $vm1
```

Fig. 2B

```
AP:
   INHERITANCE SOURCE: NONE
   ABSTRACT FLAG: true
   PROVISION FUNCTION:
       - TYPE: ConnTo<AP, AP>
   USE FUNCTION:
       - TYPE: HostedOn<*, VM>
   EXPECTED PERIPHERAL CONFIGURATION :
       - NODE:
           - id: vm1
             TYPE: VM
         EDGE:
           - CONNECTION SOURCE : $_self
             TYPE : HostedOn<*, VM>
             CONNECTION DESTINATION: $vm1
```

```
AP₁:
   INHERITANCE SOURCE : [AP]
   ABSTRACT FLAG: false
```

```
AP₂:
   INHERITANCE SOURCE : [AP]
   ABSTRACT FLAG: false
```

```
VM:
   INHERITANCE SOURCE : NONE
   ABSTRACT FLAG : true
   PROVISION FUNCTION :
       - TYPE : HostedOn<*, VM>
```

```
VM₁:
   INHERITANCE SOURCE : [VM]
   ABSTRACT FLAG: false
```

```
VM₂:
   INHERITANCE SOURCE : [VM]
   ABSTRACT FLAG: false
```

Fig. 3

```
ConnTo<AP, AP>:
  INHERITANCE SOURCE: NONE
  ABSTRACT FLAG: true
  EXPECTED PERIPHERAL CONFIGURATION:
    - NODE:
        - id: vm1
          TYPE: VM
        - id: vm2
          TYPE: VM
      EDGE:
        - CONNECTION SOURCE: $_src
          TYPE: HostedOn<*, VM>
          CONNECTION DESTINATION: $vm1
        - CONNECTION SOURCE: $_dest
          TYPE : HostedOn<*, VM>
          CONNECTION DESTINATION: $vm2
        - CONNECTION SOURCE: $vm1
          TYPE : ConnTo<VM, VM>
          CONNECTION DESTINATION: $vm2
    - NODE:
        - id: vm1
          TYPE: VM
      EDGE:
        - CONNECTION SOURCE: $_src
          TYPE: HostedOn<*, VM>
          CONNECTION DESTINATION: $vm1
        - CONNECTION SOURCE : $_dest
          TYPE: HostedOn<*, VM>
          CONNECTION DESTINATION : $vm1
```

```
Http:
  INHERITANCE SOURCE:
          [ConnTo<AP, AP>]
  ABSTRACT FLAG: false
```

```
Https:
  INHERITANCE SOURCE:
          [ConnTo<AP, AP>]
  ABSTRACT FLAG: false
```

Fig. 4

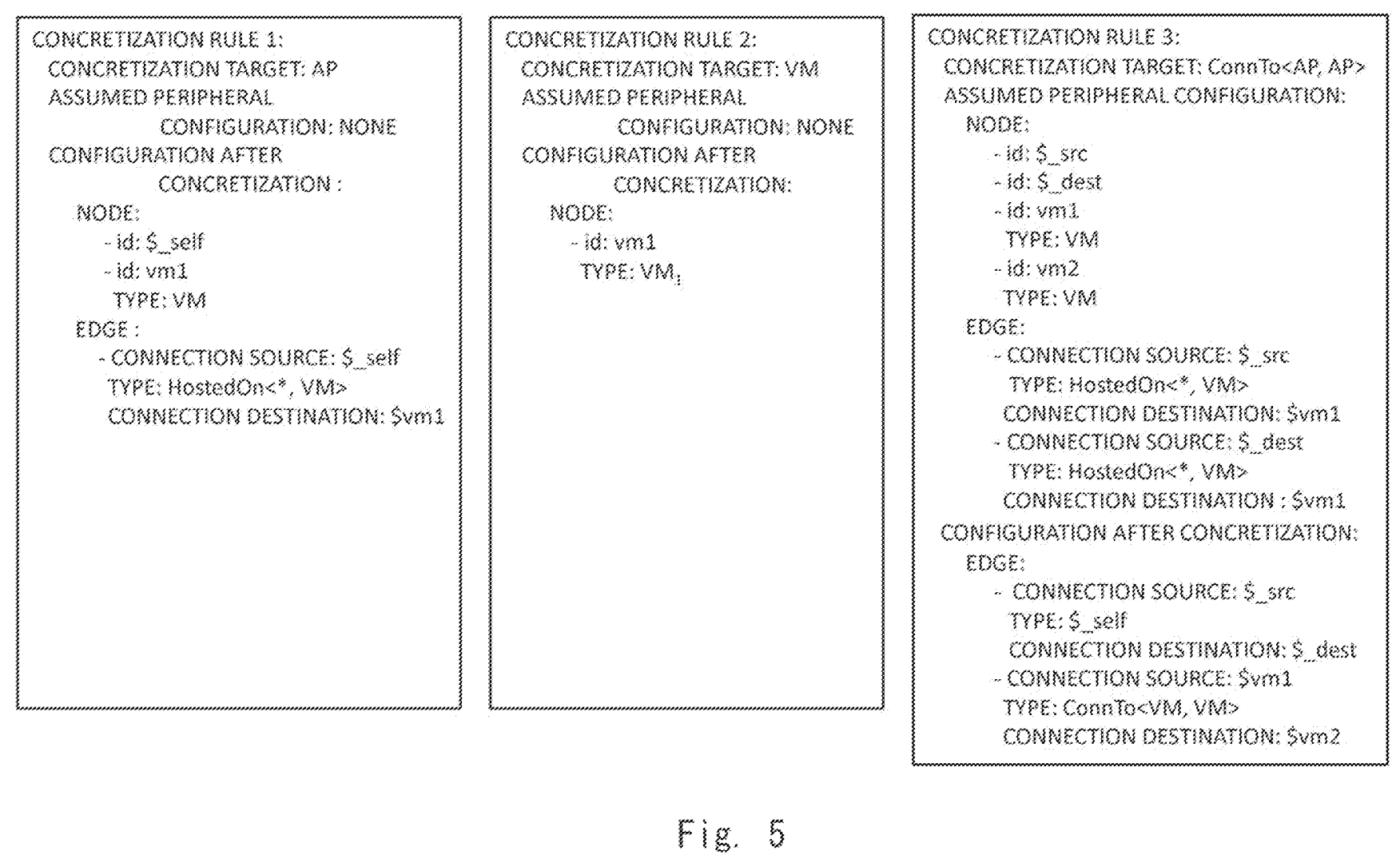

CONCRETIZATION RULE 1:
CONCRETIZATION TARGET: AP
ASSUMED PERIPHERAL
    CONFIGURATION: NONE
CONFIGURATION AFTER
    CONCRETIZATION :

NODE:
    - id: $_self
    - id: vm1
      TYPE: VM
    EDGE :
    - CONNECTION SOURCE: $_self
      TYPE: HostedOn<*, VM>
      CONNECTION DESTINATION: $vm1

CONCRETIZATION RULE 2:
CONCRETIZATION TARGET: VM
ASSUMED PERIPHERAL
    CONFIGURATION: NONE
CONFIGURATION AFTER
    CONCRETIZATION:

NODE:
    - id: vm1
      TYPE: VM

CONCRETIZATION RULE 3:
CONCRETIZATION TARGET: ConnTo<AP, AP>
ASSUMED PERIPHERAL CONFIGURATION:
    NODE:
    - id: $_src
    - id: $_dest
    - id: vm1
      TYPE: VM
    - id: vm2
      TYPE: VM
    EDGE:
    - CONNECTION SOURCE: $_src
      TYPE: HostedOn<*, VM>
      CONNECTION DESTINATION: $vm1
    - CONNECTION SOURCE: $_dest
      TYPE: HostedOn<*, VM>
      CONNECTION DESTINATION : $vm1
CONFIGURATION AFTER CONCRETIZATION:
    EDGE:
    - CONNECTION SOURCE: $_src
      TYPE: $_self
      CONNECTION DESTINATION: $_dest
    - CONNECTION SOURCE: $vm1
      TYPE: ConnTo<VM, VM>
      CONNECTION DESTINATION: $vm2

Fig. 5

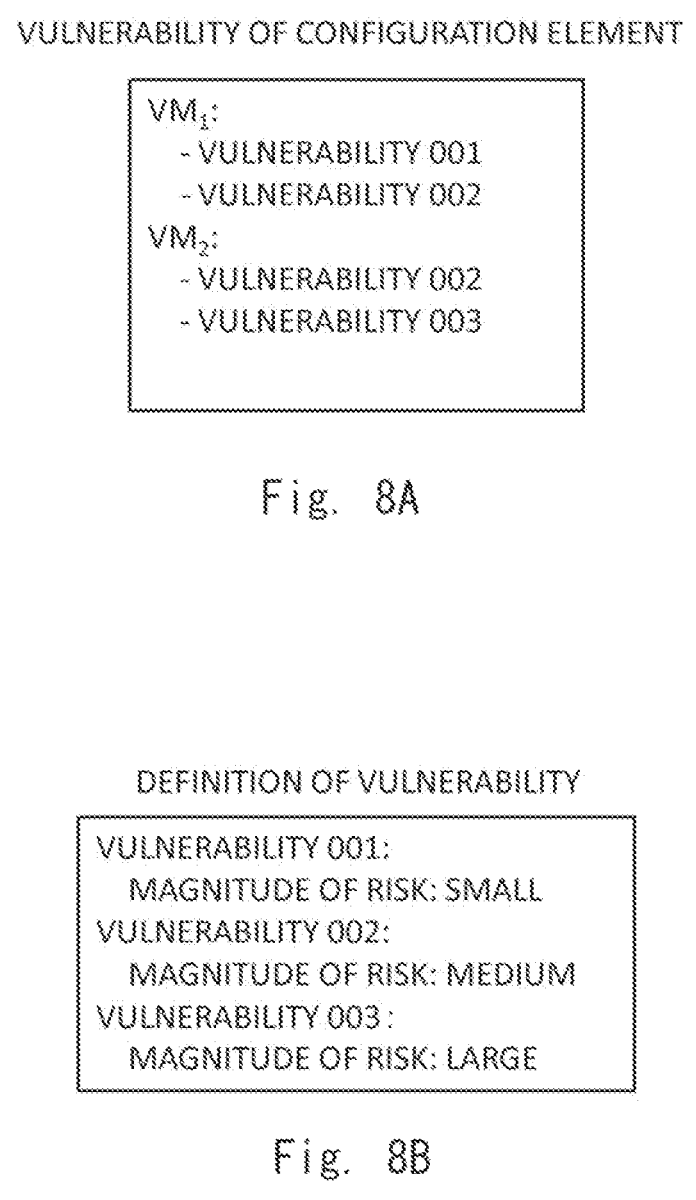

VULNERABILITY OF CONFIGURATION ELEMENT $VM_1$:
- VULNERABILITY 001
- VULNERABILITY 002
$VM_2$:
- VULNERABILITY 002
- VULNERABILITY 003

Fig. 8A

DEFINITION OF VULNERABILITY

VULNERABILITY 001:
MAGNITUDE OF RISK: SMALL
VULNERABILITY 002:
MAGNITUDE OF RISK: MEDIUM
VULNERABILITY 003:
MAGNITUDE OF RISK: LARGE

Fig. 8B

REPRESENTATION EXAMPLE OF CONFIGURATION
INFORMATION IN FORM OF FIGURE

REPRESENTATION EXAMPLE OF
CONFIGURATION INFORMATION IN FORM OF TEXT

```
CONFIGURATION:
  NODE:
    - id: ap1
      TYPE: AP₁
    - id: ap2
      TYPE: AP₂
    - id: d_ex
      TYPE: EXTERNAL DOMAIN
    - id: d_in
      TYPE: INTERNAL DOMAIN
  EDGE:
    - CONNECTION SOURCE: $ap1
      TYPE: ConnTo<AP, AP>
      CONNECTION DESTINATION: $ap2
      THREAT:
        - TYPE: EAVESDROPPING
          ATTRIBUTE:
            MAGNITUDE OF RISK: MEDIUM
    - CONNECTION SOURCE: $ap1
      TYPE: JoinIn<*, Domain>
      CONNECTION DESTINATION: $d_ex
    - CONNECTION SOURCE: $ap2
      TYPE: JoinIn<*, Domain>
      CONNECTION DESTINATION: $d_in
```

Fig. 11B

```
AP₃:
   INHERITANCE SOURCE : [AP]
   ABSTRACT FLAG: false
   USE FUNCTION:
      - TYPE: ConnTo<AP, AP>
   EXPECTED PERIPHERAL CONFIGURATION :
      - NODE:
           - id: ap1
             TYPE: AP
         EDGE:
            - CONNECTION SOURCE: $_self
              TYPE: ConnTo<AP, AP>
              CONNECTION DESTINATION: $ap1
              THREAT:
                 - TYPE: EAVESDROPPING
                   ATTRIBUTE :
                       MAGNITUDE OF RISK: LARGE
```

Fig. 12

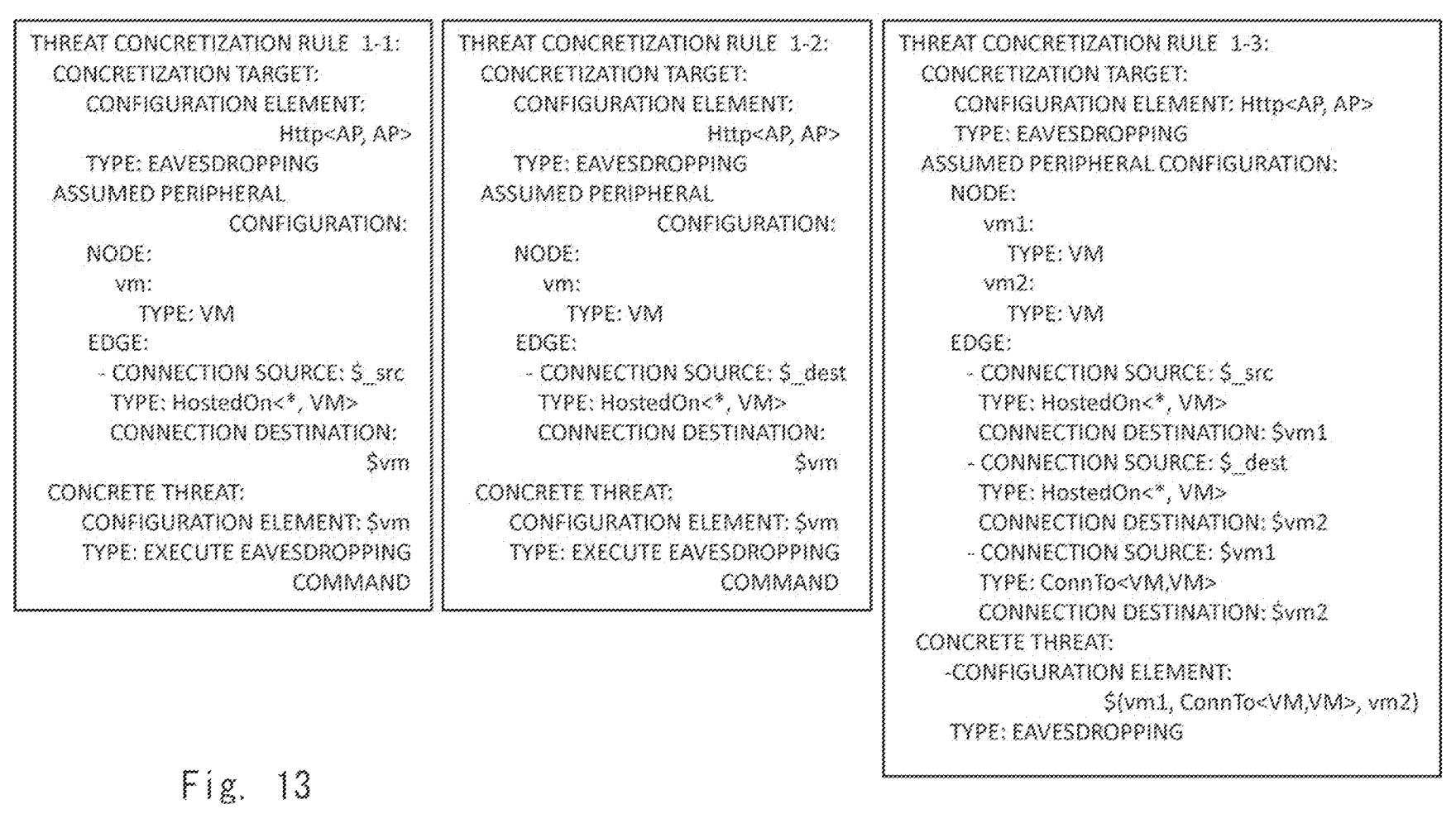

THREAT CONCRETIZATION RULE 1-1:
CONCRETIZATION TARGET:
  CONFIGURATION ELEMENT:
      Http<AP, AP>
  TYPE: EAVESDROPPING
ASSUMED PERIPHERAL
      CONFIGURATION:

NODE:
    vm:
      TYPE: VM
  EDGE:
    - CONNECTION SOURCE: $_src
      TYPE: HostedOn<*, VM>
      CONNECTION DESTINATION:
          $vm CONCRETE THREAT:
  CONFIGURATION ELEMENT: $vm
  TYPE: EXECUTE EAVESDROPPING
      COMMAND THREAT CONCRETIZATION RULE 1-2:
CONCRETIZATION TARGET:
  CONFIGURATION ELEMENT:
      Http<AP, AP>
  TYPE: EAVESDROPPING
ASSUMED PERIPHERAL
      CONFIGURATION:

NODE:
    vm:
      TYPE: VM
  EDGE:
    - CONNECTION SOURCE: $_dest
      TYPE: HostedOn<*, VM>
      CONNECTION DESTINATION:
          $vm CONCRETE THREAT:
  CONFIGURATION ELEMENT: $vm
  TYPE: EXECUTE EAVESDROPPING
      COMMAND THREAT CONCRETIZATION RULE 1-3:
CONCRETIZATION TARGET:
  CONFIGURATION ELEMENT: Http<AP, AP>
  TYPE: EAVESDROPPING
ASSUMED PERIPHERAL CONFIGURATION:
  NODE:

vm1:
      TYPE: VM
    vm2:
      TYPE: VM
  EDGE:
    - CONNECTION SOURCE: $_src
      TYPE: HostedOn<*, VM>
      CONNECTION DESTINATION: $vm1
    - CONNECTION SOURCE: $_dest
      TYPE: HostedOn<*, VM>
      CONNECTION DESTINATION: $vm2
    - CONNECTION SOURCE: $vm1
      TYPE: ConnTo<VM,VM>
      CONNECTION DESTINATION: $vm2

CONCRETE THREAT:
  -CONFIGURATION ELEMENT:
      ${vm1, ConnTo<VM,VM>, vm2)
  TYPE: EAVESDROPPING

Fig. 13

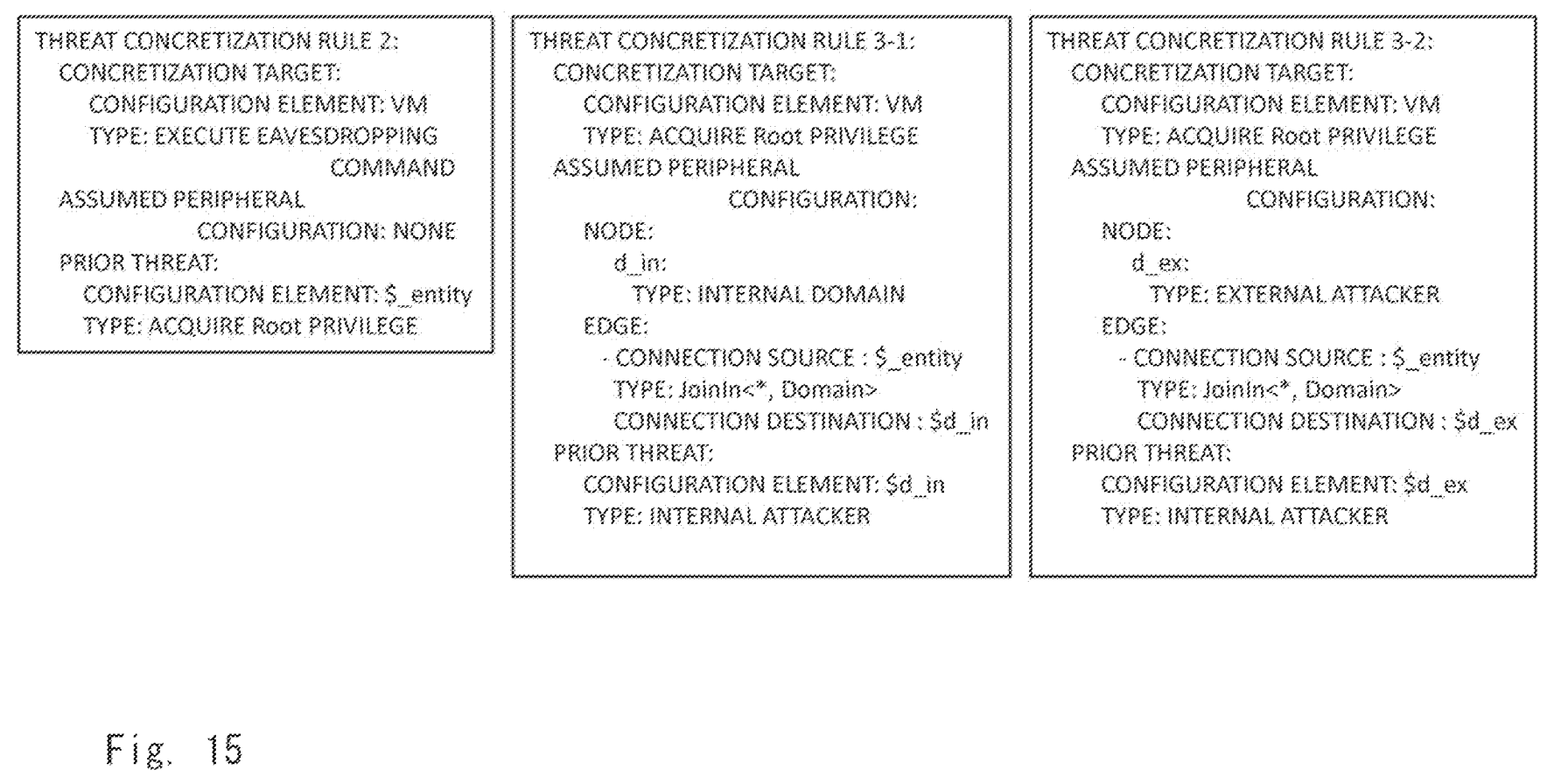

THREAT CONCRETIZATION RULE 3-2:
CONCRETIZATION TARGET:
    CONFIGURATION ELEMENT: VM
    TYPE: ACQUIRE Root PRIVILEGE
ASSUMED PERIPHERAL
            CONFIGURATION:
    NODE:
        d_ex:
            TYPE: EXTERNAL ATTACKER
    EDGE:
        - CONNECTION SOURCE : $_entity
          TYPE: JoinIn<*, Domain>
          CONNECTION DESTINATION : $d_ex
PRIOR THREAT:
    CONFIGURATION ELEMENT: $d_ex
    TYPE: INTERNAL ATTACKER THREAT CONCRETIZATION RULE 3-1:
CONCRETIZATION TARGET:
    CONFIGURATION ELEMENT: VM
    TYPE: ACQUIRE Root PRIVILEGE
ASSUMED PERIPHERAL
            CONFIGURATION:
    NODE:
        d_in:
            TYPE: INTERNAL DOMAIN
    EDGE:
        - CONNECTION SOURCE : $_entity
          TYPE: JoinIn<*, Domain>
          CONNECTION DESTINATION : $d_in
PRIOR THREAT:
    CONFIGURATION ELEMENT: $d_in
    TYPE: INTERNAL ATTACKER THREAT CONCRETIZATION RULE 2:
CONCRETIZATION TARGET:
    CONFIGURATION ELEMENT: VM
    TYPE: EXECUTE EAVESDROPPING
            COMMAND
ASSUMED PERIPHERAL
            CONFIGURATION: NONE
PRIOR THREAT:
    CONFIGURATION ELEMENT: $_entity
    TYPE: ACQUIRE Root PRIVILEGE

Fig. 15

```
- SECURITY LEVEL: 1
    ASSUMED ORIGIN OF ATTACK:
        - EXTERNAL ATTACKER
    ACCEPTABLE RISK: MEDIUM
- SECURITY LEVEL : 2
    ASSUMED ORIGIN OF ATTACK :
        - EXTERNAL ATTACKER
    ACCEPTABLE RISK: SMALL
- SECURITY LEVEL : 3
    ASSUMED ORIGIN OF ATTACK :
        - EXTERNAL ATTACKER
        - INTERNAL ATTACKER
    ACCEPTABLE RISK: NONE
```

DESIGN SCREEN (a) REQUIREMENT
EDITING PANE (b) DESIGN RESULT
CONFIRMATION PANE (c) LIST OF SELECTABLE COMPONENTS

Fig. 19

SECURE SYSTEM AUTOMATIC DESIGN APPARATUS, SECURE SYSTEM AUTOMATIC DESIGN METHOD, AND COMPUTER READABLE MEDIUM

This application is a National Stage Entry of PCT/JP2021/033729 filed on Sep. 14, 2021, the contents of all of which are incorporated herein by reference, in their entirety.

TECHNICAL FIELD

The present disclosure relates to a secure system automatic design apparatus, a secure system automatic design method, and a computer readable medium.

BACKGROUND ART

Non Patent Literature 1 discloses a technology for automatically designing a secure system configuration. This technology first generates a plurality of system configuration proposals, evaluates the security of each of the system configuration proposals, extracts system configuration proposals evaluated as secure system configurations, and outputs them. The generated system configuration proposal is concrete system configuration information, and an evaluation of the security thereof is made based on the concrete system configuration information.

Further, Patent Literature 1, Non Patent Literature 2, and Non Patent Literature 3 disclose a technology for efficiently and automatically designing a system configuration. This technology first receives abstract system configuration information as an input, and applies a concretization rule to an unconfirmed portion of the received abstract system configuration and concretizes it, thereby deriving concrete system configuration information that does not include an unconfirmed portion. The concretization is divided into a plurality of steps and then performed in a stepwise manner. A system configuration that is being concretized, which system configuration is generated in each of the steps, is referred to as a configuration draft. In each of the steps, the configuration draft is branched to a plurality of options of a concretization method and a plurality of configuration drafts are generated. This technology evaluates the generated configuration drafts, gives a high priority to favorable configuration drafts, and then proceeds to the next step, thereby limiting the number of configuration drafts and system configuration proposals generated and increasing the efficiency of automatic design.

CITATION LIST

Patent Literature

Patent Literature 1: International Patent Publication No. 2019/216082

Non Patent Literature

Non Patent Literature 1: Lukas Gressl, Christian Steger, and Ulrich Neffe, "Design Space Exploration for Secure IoT Devices and Cyber-Physical Systems", ACM Transactions on Embedded Computing Systems (TECS) 20.4 (2021): 1-24.
Non Patent Literature 2: Takayuki KURODA, Takuya KUWAHARA, Takashi MARUYAMA, Yutaka YAKUWA, Kazuki TANABE, Tatsuya FUKUDA, Kozo SATODA, and Takao OSAKI, "Acquisition of Knowledge about ICT System Designing with Machine Learning", The Transactions of the Institute of Electronics, Information and Communication Engineers Vol. J104-B, No. 3, pp. 140-151, 2021.
Non Patent Literature 3: Takuya KUWAHARA, Takayuki KURODA, Takao OSAKI, Kozo SATOD, "An intent-based system configuration design for IT/NW services with functional and quantitative constraints", IEICE Trans Commun. Vol.E104-B, No. 7, pp. 791-804, 2021, [Retrieved on Aug. 10, 2021], Internet <URL: https://doi.org/10.1587/transcom.2020CQP0009>

SUMMARY OF INVENTION

Technical Problem

In the automatic design technology of the system configuration illustrated in Non Patent Literature 1, it is necessary to repeat generation of a system configuration proposal and evaluation of it many times in order to search for (i.e., find) a system configuration proposal that satisfies certain conditions. Therefore, it takes a long time to derive a solution for searching for such a system configuration proposal.

In the automatic design technologies of the system configuration illustrated in Patent Literature 1, Non Patent Literature 2, and Non Patent Literature 3, time required to derive the solution is reduced by narrowing down the search range. However, in the process of the processing, the security of the generated system configuration proposal is not taken into consideration and thus an insecure system configuration is derived.

It is difficult to derive a secure system configuration by making an evaluation of security in a manner similar to that disclosed in Non Patent Literature 1. In the technologies illustrated in Patent Literature 1, Non Patent Literature 2, and Non Patent Literature 3, a scheme to reduce time required to derive the solution is to evaluate a configuration draft at a stage where the configuration draft which is abstract system configuration information is generated and limit the search range. However, security evaluation means disclosed in Non Patent Literature 1 is not applicable to the configuration draft since it is intended for concrete system configuration information. The above security evaluation means can be applied at a stage where concrete system configuration information is generated. However, when the generation of concrete system configuration information and the evaluation of security are repeated until secure system configuration information is generated, it takes a long time to derive the solution.

Therefore, an object of the present disclosure is to provide a secure system automatic design apparatus, a secure system automatic design method, and a computer readable medium that are capable of solving the above-described problem, and efficiently performing an automatic design of a secure system.

Solution to Problem

A secure system automatic design apparatus according to an example aspect includes:

an input/output unit configured to receive an input of a system requirement and output a system configuration;

a configuration information concretization unit configured to convert the system requirement into the system configuration through a plurality of concretization procedures; and a security evaluation unit configured to evaluate security of the system configuration, in which in each of the concretization procedures, the configuration information concretization unit generates a plurality of configuration drafts, each of the configuration drafts being configuration information that is being converted and each of the configuration drafts being branched to a plurality of options of a concretization method, the security evaluation unit also evaluates security of each of the configuration drafts generated through the respective procedures, and the configuration information concretization unit determines the option to be branched based on a result of the evaluation of each of the configuration drafts by the security evaluation unit.

A secure system automatic design method according to an example aspect is a secure system automatic design method performed by a secure system automatic design apparatus, the secure system automatic design method including:

a first step of receiving an input of a system requirement;

a second step of converting the system requirement into a system configuration through a plurality of concretization procedures;

a third step of evaluating security of the system configuration; and a fourth step of outputting the system configuration, in which in the second step, in each of the concretization procedures, a plurality of configuration drafts are generated, each of the configuration drafts being configuration information that is being converted and each of the configuration drafts being branched to a plurality of options of a concretization method, security of each of the configuration drafts generated through the respective procedures is also evaluated, and the option to be branched is determined based on a result of the evaluation of each of the configuration drafts.

A computer readable medium according to an example aspect is a non-transitory computer readable medium storing a program to be executed by a computer, the program including:

a first procedure of receiving an input of a system requirement;

a second procedure of converting the system requirement into a system configuration through a plurality of concretization procedures;

a third procedure of evaluating security of the system configuration; and a fourth step of outputting the system configuration, in which in the second procedure, in each of the concretization procedures, a plurality of configuration drafts are generated, each of the configuration drafts being configuration information that is being converted and each of the configuration drafts being branched to a plurality of options of a concretization method, security of each of the configuration drafts generated through the respective procedures is also evaluated, and the option to be branched is determined based on a result of the evaluation of each of the configuration drafts.

Advantageous Effects of Invention

According to the above-described example aspects, it is possible to achieve an effect that a secure system automatic design apparatus, a secure system automatic design method, and a computer readable medium that are capable of efficiently performing an automatic design of a secure system can be provided.

BRIEF DESCRIPTION OF DRAWINGS

FIG. 2B is a diagram showing a representation example of configuration information in the form of a text:

FIG. 3 is a diagram showing a definition example of a component type:

FIG. 4 is a diagram showing a definition example of a relationship type:

FIG. 5 is a diagram showing a definition example of a concretization rule:

FIG. 8A is a diagram showing an example of a vulnerability of a configuration element;

FIG. 8B is a diagram showing a definition example of a vulnerability;

FIG. 11B is a diagram showing a representation example of configuration information according to the second example embodiment in the form of a text:

FIG. 12 is a diagram showing an example of a configuration element type according to the second example embodiment:

FIG. 13 is a diagram showing an example of a threat concretization rule:

FIG. 15 is a diagram showing another example of the threat concretization rule:

FIG. 17 is a diagram showing a definition example of a security level:

FIG. 19 is a diagram showing an example of a design screen:

EXAMPLE EMBODIMENT

Example embodiments according to the present disclosure will be described hereinafter with reference to the drawings. Note that, for the clarification of the description, the following descriptions and the drawings are partially omitted and simplified as appropriate. Further, the same elements are denoted by the same reference symbols throughout the drawings, and redundant descriptions are omitted as necessary.

First Example Embodiment

First, a configuration of a first example embodiment will be described.

Figure 1:
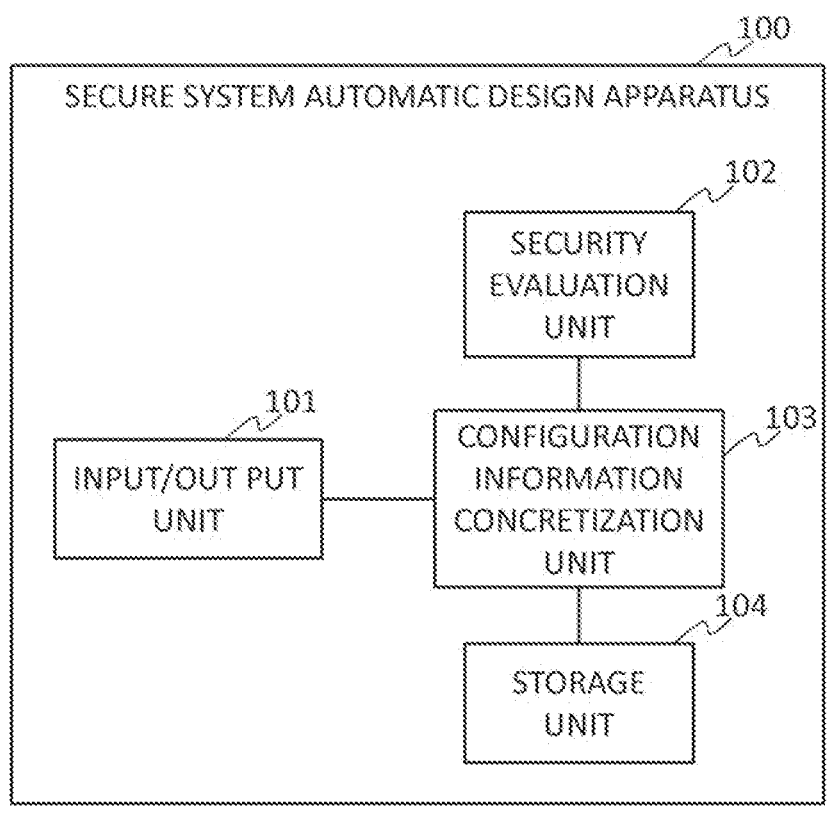
FIG. 1 is a schematic block diagram showing a functional configuration example of a secure system automatic design apparatus according to a first example embodiment.

FIG. 1 is a schematic block diagram showing a functional configuration example of a secure system automatic design apparatus 100 according to the first example embodiment. As shown in FIG. 1, the secure system automatic design apparatus 100 includes an input/output unit 101, a security evaluation unit 102, a configuration information concretization unit 103, and a storage unit 104. The configuration information concretization unit 103 is connected to each of the input/output unit 101, the security evaluation unit 102, and the storage unit 104 so that they can communicate with each other.

The input/output unit 101 receives information about system requirements and an input of risks acceptable to a user from a terminal (not shown) of the user, and passes it to the configuration information concretization unit 103. Further, the input/output unit 101 receives concrete system configuration information from the configuration information concretization unit 103, and outputs it to the terminal of the user.

The configuration information concretization unit 103 divides the system requirement into a plurality of steps ("stages" or "procedures") and concretizes them in a stepwise manner and consequently generates system configuration information. In each of the above steps, a plurality of configuration drafts are generated. In order to generate the configuration drafts, the configuration information concretization unit 103 acquires information about configuration elements and concretization rules from the storage unit 104. Further, the configuration information concretization unit 103 passes the configuration drafts to the security evaluation unit 102 to acquire a result of the evaluation of the security of each of the configuration drafts.

When the security evaluation unit 102 receives a configuration draft from the configuration information concretization unit 103, it evaluates the security of the configuration draft and returns a result of the evaluation.

The storage unit 104 stores the information about configuration elements and concretization rules, and returns the information about configuration elements and concretization rules in response to a request from the configuration information concretization unit 103.

Next, data used in the first example embodiment will be described.

Configuration information is information indicating a configuration of the system. A system requirement, a system configuration, and a configuration draft are respective types of configuration information. The system requirement is configuration information input as a requirement expected by a user, the configuration draft is configuration information generated by the secure system automatic design apparatus 100 during designing, and the system configuration is configuration information output as a result of the design performed by the secure system automatic design apparatus 100. The system requirement and the configuration draft may include uncertain elements, i.e., abstract elements or insufficient elements. However, the system configuration does not include uncertain elements.

Configuration information is composed of nodes and edges. The nodes represent components that comprise the system, and the edges represent relationships between the components. The components and the relationships are collectively referred to as a configuration element. An identification (ID) and a type name representing the type of a configuration element is added to the configuration element. In addition, an attribute value may be added to the configuration element. Further, a constraint condition to be satisfied by the node and the edge may be added to the configuration information in addition to the node and the edge.

Figure 2A:
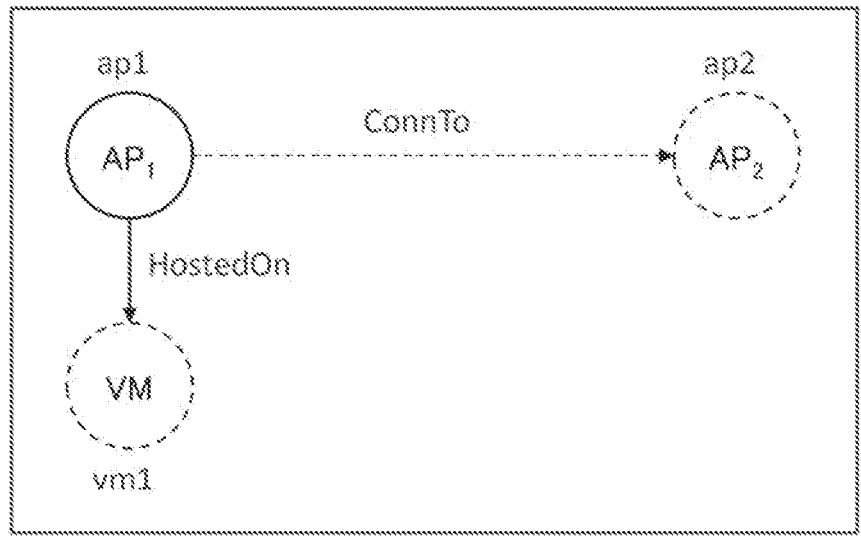
FIG. 2A is a diagram showing a representation example of configuration information in the form of a figure.

Each of FIGS. 2A and 2B shows an example of configuration information. As methods for representing configuration information, a representation method using a figure and a representation method using a text can be used. In the present specification, a representation method using a figure is mainly used within a range where strictness does not become a problem.

FIG. 2A shows a representation example of configuration information in the form of a figure. Circles indicate nodes, and arrows connecting the circles indicate edges. Type names of the components are shown inside the respective circles. Type names of the relationships are shown near the respective arrows. Regarding the type names of the relationships, information about types of both ends is omitted in the figure. IDs of the components are shown near the respective circles, which are omitted as appropriate. A dotted line indicates an abstract configuration element, while a solid line indicates a concrete configuration element.

FIG. 2B shows a representation example of configuration information similar to that of FIG. 2A in the form of a text. In a definition example in the form of a text in the present specification, YAML format is basically used. The configuration information is composed of a list of nodes and a list of edges, and for each node, an id and a type are defined. For each edge, an id of a node of a connection source, a type of a relationship, and an id of a node of a connection destination are defined. An id whose first character is a dollar mark "$" indicates that it refers to an id defined in another part. Two elements separated by commas in a parentheses "< >" added after the type name of the relationship are both the type names of the nodes, which specify the types of nodes to be specified as a connection source and a connection destination of the relationship. An asterisk "*" is specified in a part where the type of the node is not specified.

FIG. 3 shows definition examples of six kinds of component types. For each component type, an inheritance source (parent, source of inherit), an abstract flag, a provision function, a use function, and an expected peripheral configuration can be specified. For the inheritance source, the type name of another component that the component type inherits is specified. The AP and the VM inherit nothing since they are the underlying classes. In contrast, the $AP_1$ and the $AP_2$ inherit the AP, and the $VM_1$ and the $VM_2$ inherit the VM. Types that inherit other types inherit information about a provision function, a use function, and an expected peripheral configuration from the inheritance source. However, for the types that inherit other types, the information inherited from the inheritance source is omitted. The abstract flag is a flag indicating whether or not the component type is an abstract configuration element. The AP and the VM are abstract, while the other four components are concrete. The provision function defines a relationship in which it is assumed that the component will be connected from another component. Further, the use function defines a relationship in which it is assumed that the component will be connected to another component. The expected peripheral configuration represents the peripheral configuration of the component to be satisfied in order for the component to operate. For example, for the AP to operate, the VM is required and the AP has to be connected to the VM in a HostedOn relationship. Therefore, as a configuration expected by the AP, a peripheral configuration representing the above situation is defined. Note that the number of expected peripheral configurations to be specified may be more than one, and when more than one expected peripheral configuration is specified, it is interpreted that one of the peripheral configurations may be satisfied.

FIG. 4 shows definition examples of three kinds of relationship types. For each relationship type, an inheritance source, an abstract flag, and an expected peripheral configuration can be specified. ConnTo<AP, AP> inherit nothing since it is the underlying class. In contrast, Http and Https inherit ConnTo<AP, AP>. Types that inherit other types inherit information about an expected peripheral configuration from the inheritance source. However, for the types that inherit other types, the information inherited from the inheritance source is omitted. ConnTo<AP, AP> is an abstract relationship type representing a relationship between two applications that are connected so that they can communicate with each other. Concrete types of ConnTo<AP, AP> include Http and Https. Lower-layer communication has to be established in order to establish ConnTo<AP, AP>, a configuration related to the lower-layer communication is defined as the expected peripheral configuration. Since the concrete configuration thereof depends on whether the APs at both ends are hosted by the same VM or different VMs, two different types of expected peripheral configurations are defined. In a first case of the expected peripheral configuration, a situation where the APs at both ends are hosted by different VMs, in which case the two VMs specify a configuration that the two VMs are connected so that they can communicate with each other. In a second case of the expected peripheral configuration, a situation where the APs at both ends are hosted by the same single VM, in which case no further configuration is required, and thus there is no specific description.

FIG. 5 shows definition examples of three kinds of concretization rules. The concretization rule is information in which a method for concretizing configuration information is defined. For each concretization rule, a concretization target, an assumed peripheral configuration, and a configuration after concretization are specified. For the concretization target, a type name of a configuration element to be concretized is specified. Each concretization rule uses only one configuration element as a concretization target, and only one configuration element is concretized in a one-step concretization. For the assumed peripheral configuration, a peripheral configuration to be satisfied in advance when this concretization rule is applied is specified. That is, the concretization rule is applied only when the configuration indicated in the assumed peripheral configuration is recognized in the periphery of the configuration element of the concretization target. The configuration after concretization specifies a configuration remaining after the concretization rule is applied. When the concretization rule is applied, the configuration element of the concretization target is replaced with the configuration indicated in the configuration after concretization. A concretization rule 1 is a rule for allowing an AP to host a VM. The "$_self" described in the configuration after concretization indicates a configuration element of the concretization target, and thus the configuration element of the concretization target is saved even after concretization. In addition, a new node of the VM type is prepared, and $_self and the above node of the VM type are connected by a HostedOn type relationship. A concretization rule 2 replaces an abstract configuration element of the VM type with a concrete configuration element of the $VM_1$ type. In a situation where APs at both ends are hosted by different VMs, a concretization rule 3 complements, with regard to a ConnTo<AP, AP> relationship, a ConnTo<VM, VM> type relationship that connects the two VMs with each other. Note that "$_src" and "$_dest" described in the concretization rule 3 respectively indicate the ID of the node of the connection source and the ID of the node of the connection destination of the relationship of the concretization target.

Figure 6:
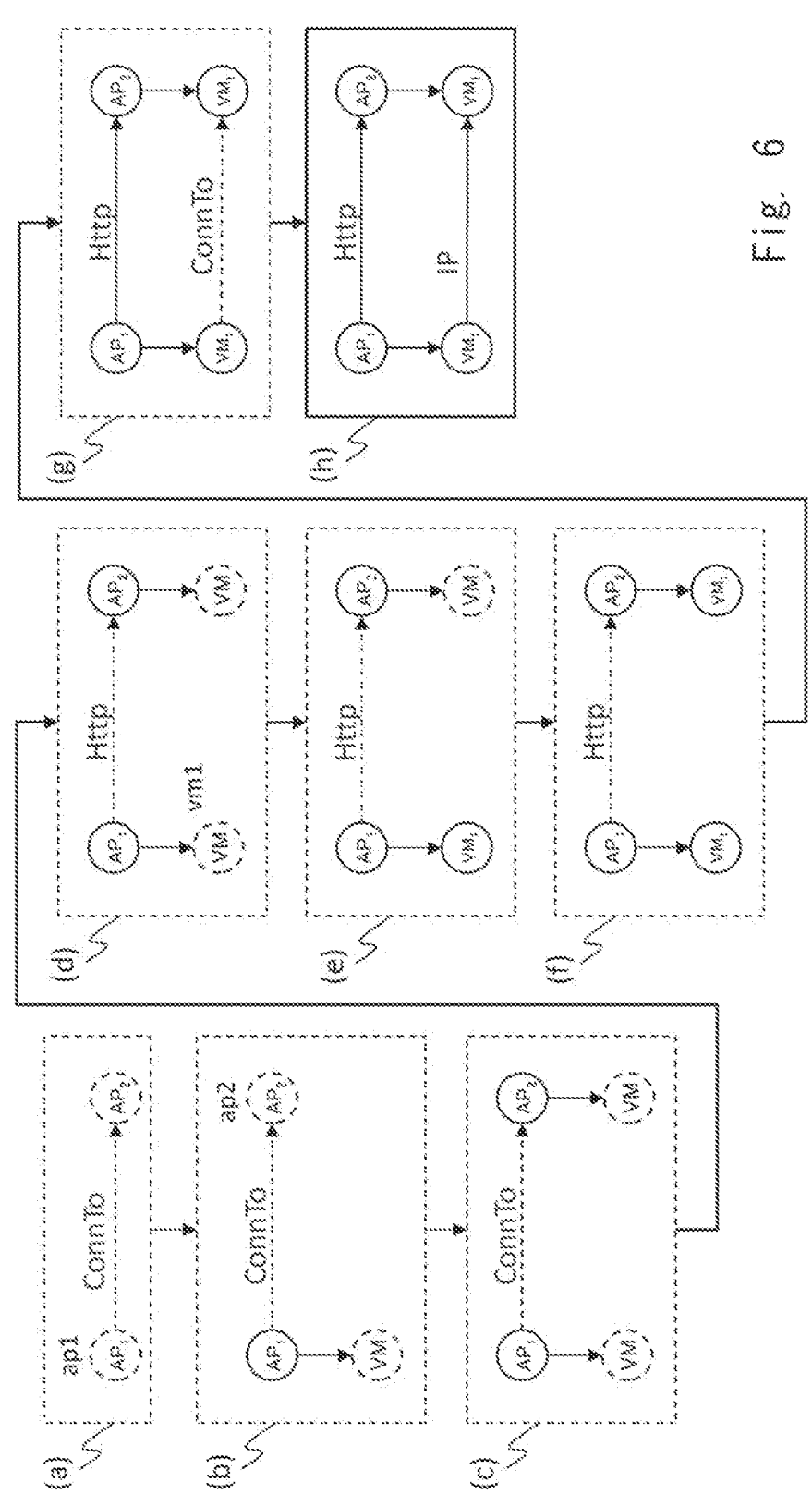
FIG. 6 is a diagram showing an example in which a system requirement is being concretized in a stepwise manner.

FIG. 6 shows an example in which a system requirement is being concretized in a stepwise manner. For example, (b) is generated by applying the concretization rule 1 described in FIG. 5 to a node of ap1 in (a). Further, (e) is generated by applying the concretization rule 2 described in FIG. 5 to vm1 in (d). Further, (g) is generated by applying the concretization rule 3 described in FIG. 5 to Http in (f).

It is determined that each configuration element is concrete when two conditions are satisfied: a condition that the abstract flag of its type is true; and a condition that the expected peripheral configuration is satisfied. It is determined that a configuration draft is concrete when all the contained configuration elements are concrete.

Figure 7:
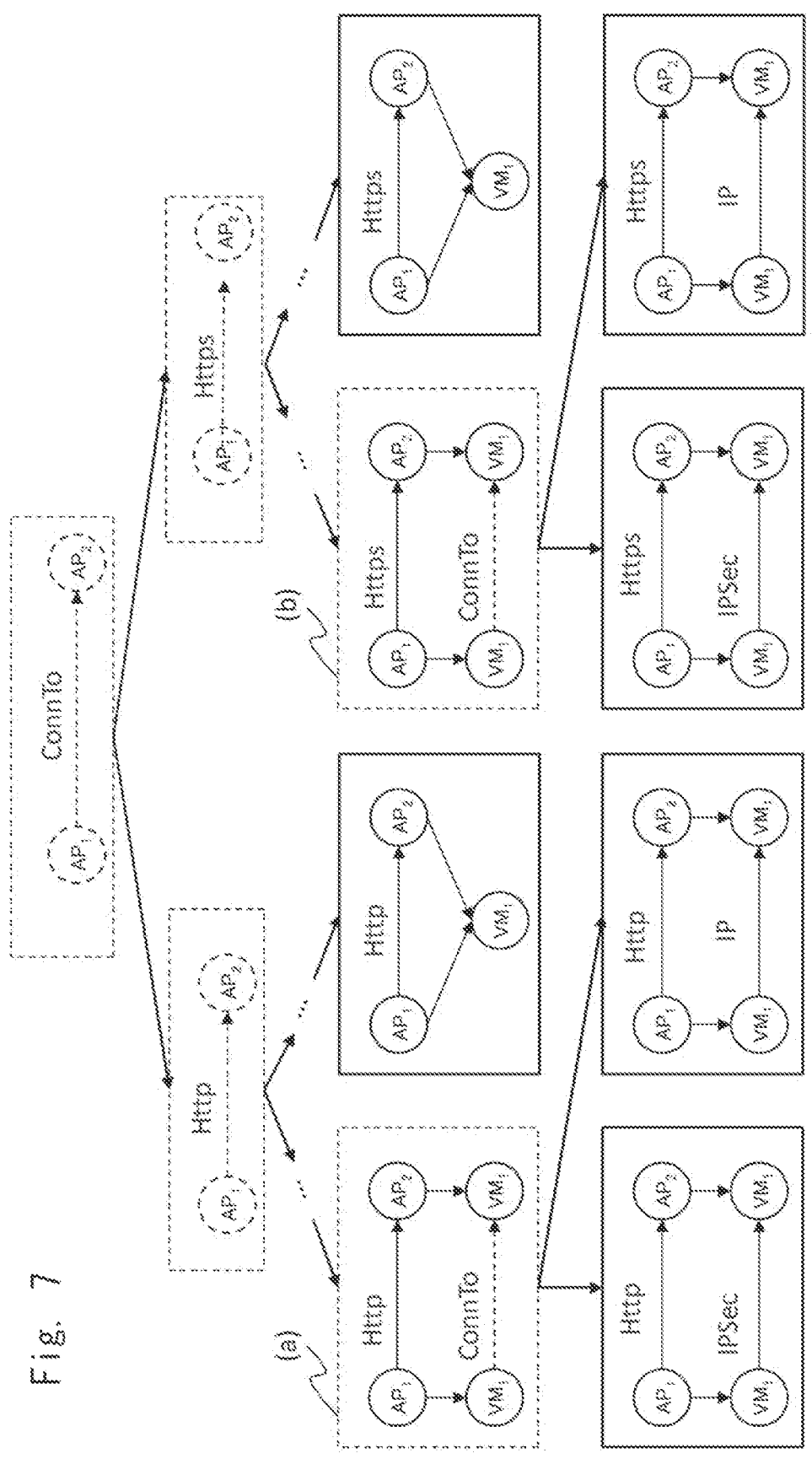
FIG. 7 is a diagram showing an example in which a configuration draft is being branched and generated.

FIG. 7 shows an example in which a configuration draft is being branched and generated. A plurality of configuration drafts may be generated by concretizing one configuration draft in one step due to two circumstances: a plurality of different concretization rules may be defined for the same configuration element type; and one configuration draft includes a plurality of abstract configuration elements. The set of the resulting configuration drafts on the tree is referred to as a configuration draft tree. An enormous number of configuration drafts may be generated from one system requirement. However, it is expected that the system configuration will be derived efficiently by avoiding all the configuration drafts that may be generated from being actually generated and by focusing on favorable configuration drafts that satisfy certain conditions and then proceeding with the concretization.

Each of FIGS. 8A and 8B shows an example of information about a vulnerability according to the first example embodiment. The information about a vulnerability includes the vulnerabilities of the configuration elements shown in FIG. 8A and the definition of each of the vulnerabilities shown in FIG. 8B. In FIG. 8A, the vulnerabilities related to two configuration elements, $VM_1$ and $VM_2$, are defined, and a vulnerability 001 and a vulnerability 002 are specified for $VM_1$ and a vulnerability 002 and a vulnerability 003 are specified for $VM_2$. Further, in FIG. 8B, the magnitude of the risk of each of the vulnerabilities is specified as the definition of the vulnerability, and the magnitude of the vulnerability 001 is defined as large, the magnitude of the vulnerability 002 is defined as medium, and the magnitude of the vulnerability 003 is defined as small. Note that the information shown in FIGS. 8A and 8B is stored in the storage unit 104.

Next, operations of the first example embodiment will be described.

Figure 9:
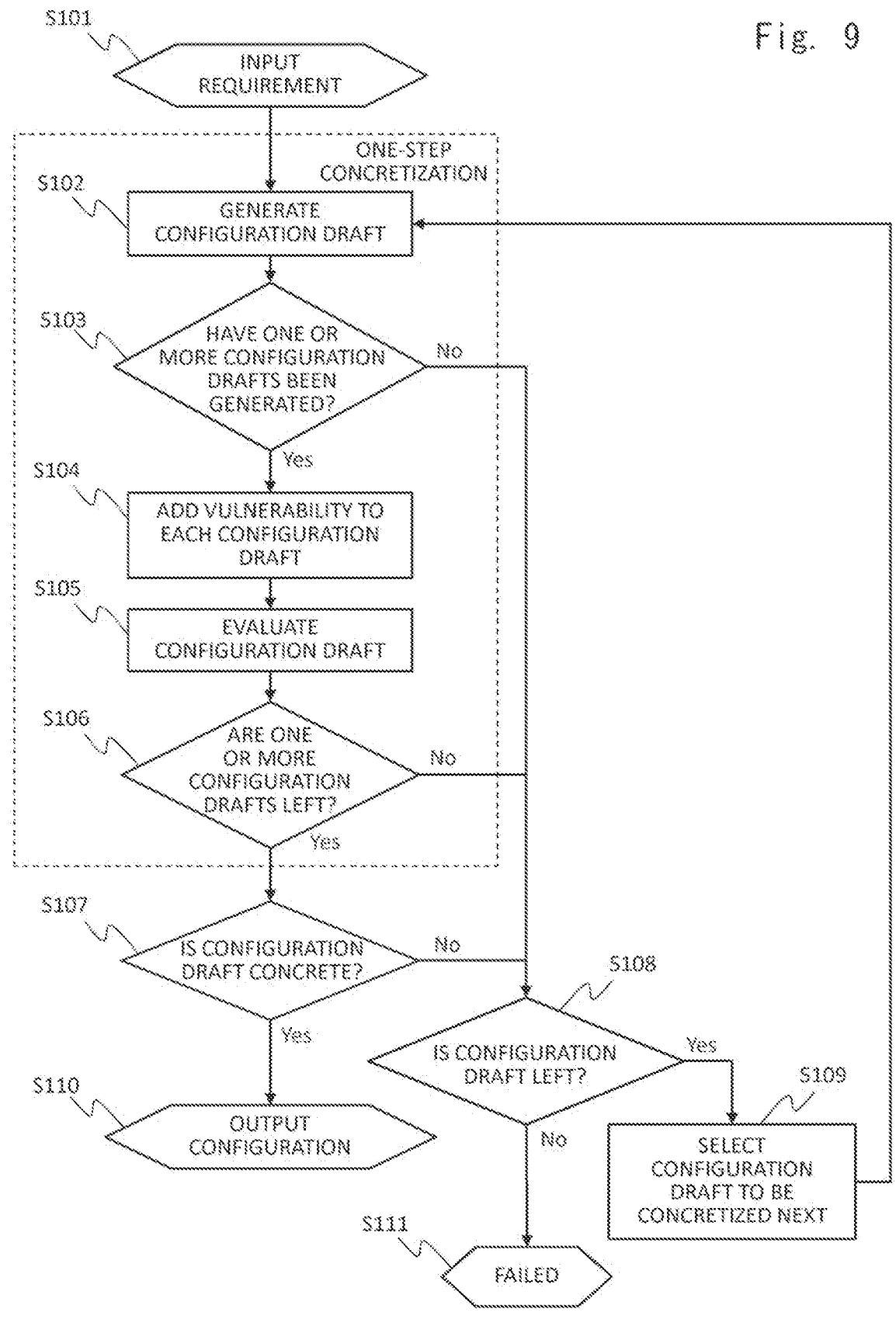
FIG. 9 is a flowchart showing an example of operations performed by the secure system automatic design apparatus according to the first example embodiment.

FIG. 9 is a flowchart showing an example of operations performed by the secure system automatic design apparatus 100 according to the first example embodiment. First, an overall outline of the operations will be described.

First, the configuration information concretization unit 103 receives an input of a system requirement and an acceptable risk from a terminal of a user through the input/output unit 101 (S101). Next, the configuration information concretization unit 103 concretizes the system requirement in a stepwise manner based on the acceptable risk (S102 to S109), and outputs the fully concretized system configuration to the terminal of the user through the input/output unit 101 (S110). As the stepwise concretization, the configuration information concretization unit 103 first implements one-step concretization (S102 to S106), and checks whether or not a concrete configuration draft is included in a plurality of obtained configuration drafts (S107). It is determined that a configuration draft is concrete when all the contained configuration elements are concrete. It is determined that each configuration element is concrete when two conditions are satisfied: a condition that the abstract flag of its type is true; and a condition that the expected peripheral configuration is satisfied. Information about the configuration element type required to determine whether or not a configuration draft is concrete is stored in the storage unit 104, and the configuration information concretization unit 103 reads it from the storage unit 104. When a concrete configuration draft is included (Yes in S107), the configuration information concretization unit 103 outputs the concrete configuration draft as a system configuration (S110). When a concrete configuration draft is not included (No in S107), the configuration information concretization unit 103 checks whether or not any other abstract configuration draft still remains in the configuration draft tree (S108). When an abstract configuration draft still remains (Yes in S108), the configuration information concretization unit 103 appropriately selects a configuration draft to be concretized next (S109), and again implements the one-step concretization. When no concrete configuration draft remains (No in S108), the configuration information concretization unit 103 can no longer examine the design, and therefore the concretization fails and is terminated (S111).

In the one-step concretization, first, the configuration information concretization unit 103 generates a plurality of configuration drafts by applying an applicable concretization rule to the system requirement input in S101 or the configuration draft selected to be concretized next in S109 (S102). Information about the configuration element type (e.g., information shown in FIGS. 3 and 4) and information about the concretization rule (e.g., information shown in FIG. 5) required to generate configuration drafts are stored in the storage unit 104, and the configuration information concretization unit 103 reads them from the storage unit 104. After that, the configuration information concretization unit 103 checks whether or not one or more configuration drafts have actually been generated (S103). When no configuration drafts have been generated (No in S103), the configuration information concretization unit 103 proceeds to concretize other configuration drafts on the configuration draft tree (S108) since the one-step concretization has failed. When one or more configuration drafts have been generated (Yes in S103), the configuration information concretization unit 103 adds a vulnerability to each of the configuration drafts (S104). For example, in a case where the vulnerability illustrated in FIG. 8A is defined, when there are newly generated $VM_1$ type components in the configuration drafts, the configuration information concretization unit 103 adds the attributes of the vulnerability 001 and the vulnerability 002 thereto, and similarly, when there are newly generated $VM_2$ type components in the configuration drafts, the configuration information concretization unit 103 adds the attributes of the vulnerability 002 and the vulnerability 003 thereto. Information required to add a vulnerability to the configuration draft (e.g., information shown in FIG. 8A) is stored in the storage unit 104, and the configuration information concretization unit 103 reads it from the storage unit 104.

Next, the configuration information concretization unit 103 evaluates each configuration draft based on the added vulnerability, and rejects the configuration draft which it is determined is ineligible (S105). The configuration information concretization unit 103 passes the configuration draft and information about the acceptable risk to the security evaluation unit 102 in order to evaluate the configuration draft, and receives a result of the evaluation. The security evaluation unit 102 evaluates the configuration draft as being secure when there is no vulnerability including a risk whose size exceeds the acceptable risk among the vulnerabilities of the configuration elements included in the configuration draft, while it evaluates the same as being insecure otherwise. Information required to evaluate the configuration draft (e.g., information shown in FIG. 8B) is stored in the storage unit 104, and the security evaluation unit 102 reads it from the storage unit 104.

For example, in the configuration draft tree shown in FIG. 7, regarding the configuration draft including $VM_1$, the vulnerabilities 001 and 002 are pending problems. When the magnitude of the acceptable risk given by a user is medium, both of these vulnerabilities are acceptable, and therefore they are evaluated as being secure. On the other hand, when the magnitude of the acceptable risk is small, the vulnerability 002 is not acceptable, and therefore the above configuration drafts are evaluated as being insecure. Since the configuration drafts evaluated as being insecure are rejected, subsequent concretizations are cancelled. In the configuration draft tree shown in FIG. 7, when the configuration drafts are evaluated as being insecure at the steps (a) and (b), concretizations subsequent to the steps (a) and (b) are omitted.

The sooner a configuration draft connecting to a configuration draft that will be ultimately rejected is rejected in the concretization step, the more efficient the automatic design processing becomes. For example, when $VM_1$ and $VM_2$ are the only component types after the VM type is concretized, the vulnerability 002 is necessarily added to a component of the VM type, and therefore the vulnerability 002 may be further added as a vulnerability of the configuration element of the VM type. In this case, it can be expected that the efficiency of design will be improved by evaluating the security at an early stage when VM appears in the configuration draft.

Note that the evaluation of the configuration draft may be further made based on system requirements, configuration element types, and constraint conditions defined separately in the concretization rules using other evaluation means not shown. Further, the evaluation of the configuration draft may be determined by considering the evaluation about security and the evaluation based on other factors (e.g., performance and cost) together.

According to the first example embodiment, the configuration information concretization unit 103 immediately rejects the configuration draft in which the presence of the vulnerability is clarified by the security evaluation unit 102, and thus can omit subsequent concretizations and efficiently derive a secure system.

Second Example Embodiment

Next, a configuration of a second example embodiment will be described.

Figure 10:
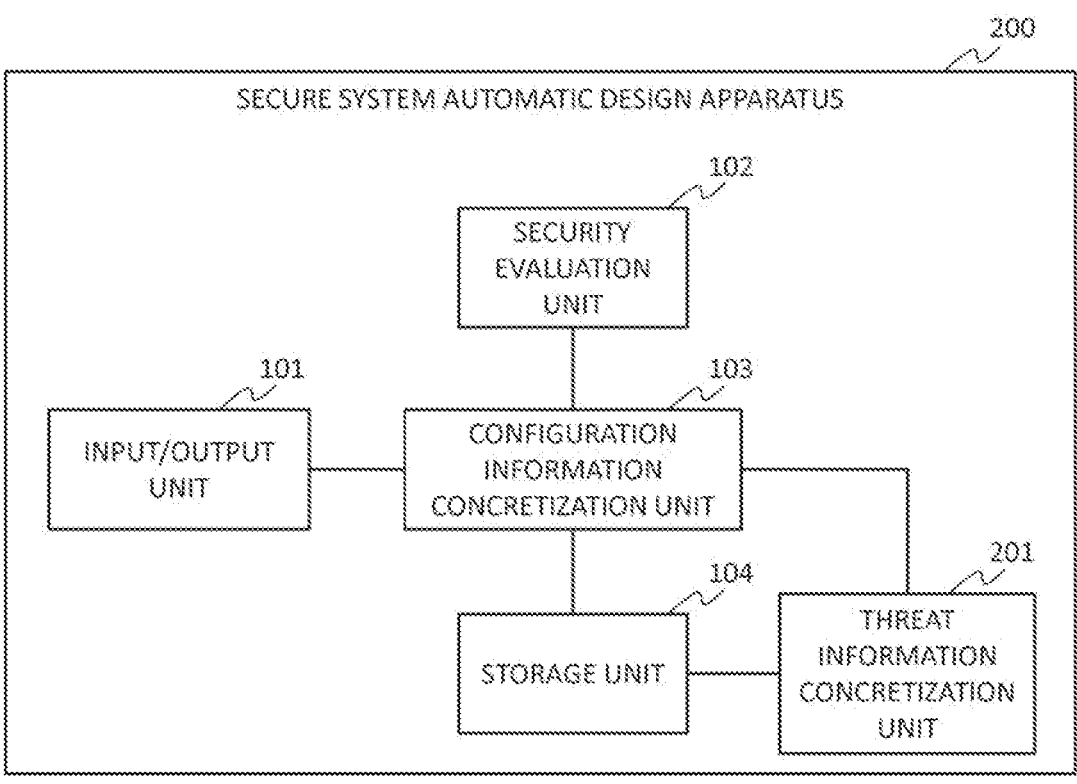
FIG. 10 is a schematic block diagram showing a functional configuration example of a secure system automatic design apparatus according to a second example embodiment.

FIG. 10 is a schematic block diagram showing a functional configuration example of a secure system automatic design apparatus 200 according to the second example embodiment. As shown in FIG. 10, the secure system automatic design apparatus 200 differs from the secure system automatic design apparatus 100 according to the first example embodiment in that the secure system automatic design apparatus 200 further includes a threat information concretization unit 201. The threat information concretization unit 201 is connected to each of the configuration information concretization unit 103 and the storage unit 104 so that they can communicate with each other.

Information received by the input/output unit 101 according to the second example embodiment is information about a system requirement and information about a security level requested by a user. The system requirements and configuration element types according to the second example embodiment further include information about threats to be defended. Further, the storage unit 104 according to the second example embodiment further stores information about threat concretization rules, which are concretization rules regarding threats, and information about a definition of the security level.

When the configuration information concretization unit 103 according to the second example embodiment generates a configuration draft at each step of concretization, the configuration information concretization unit 103 passes the above configuration draft to the threat information concretization unit 201 to concretize threat information included in the above configuration draft, and then passes the configuration draft including the concretized threat information and information about the security level requested by a user to the security evaluation unit 102 to evaluate the security.

The security evaluation unit 102 according to the second example embodiment evaluates the security of the above configuration draft based on threat information and information about the security level included in the configuration draft received from the configuration information concretization unit 103.

When the threat information concretization unit 201 according to the second example embodiment receives a configuration draft from the configuration information concretization unit 103, the threat information concretization unit 201 concretizes the threat information included in the received configuration draft based on the contents of the configuration draft, and returns the configuration draft including the concretized threat information to the configuration information concretization unit 103.

Next, data used in the second example embodiment will be described.

Figure 11A:
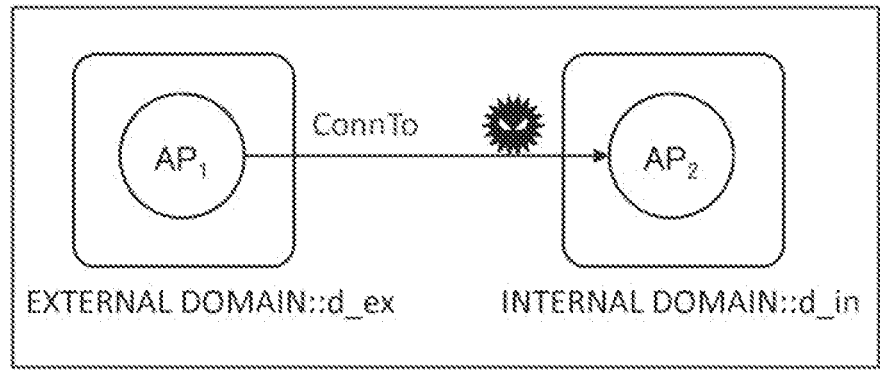
FIG. 11A is a diagram showing a representation example of configuration information according to the second example embodiment in the form of a figure.

Each of FIGS. 11A and 11B shows an example of configuration information according to the second example embodiment. The configuration information according to the second example embodiment differs from the configuration information according to the first example embodiment in that information about threats to be defended is added to the configuration information according to the second example embodiment. Each of FIGS. 11A and 11B illustrates a configuration in which there are two applications of the AP$_1$ type and the AP$_2$ type, these two applications are connected by a ConnTo<AP, AP> type relationship, and belong to two respective network domains, an external domain and an internal domain. In addition, an eavesdropping-type threat is specified for the ConnTo<AP, AP> type edge connecting the above two applications to each other, and the magnitude of the risk is specified as medium.

FIG. 11A shows a representation example of configuration information in the form of a figure. A virus icon indicates that a threat to the above ConnTo<AP, AP> type edge exists. Note that, although a network domain is a node, it is indicated by a rounded rectangle instead of a circle in the second example embodiment. It is assumed that, by placing nodes inside a network domain, it is represented that the internal nodes are connected to the network domain by a JoinIn<*, Domain> type relationship. Further, the description of "external domain::d_ex" indicates that the node is of the external domain type and the ID is d_ex.

FIG. 11B shows a representation example of configuration information similar to that of FIG. 11A in the form of a text. FIG. 11B represents that a threat is defined for the ConnTo<AP, AP> type edge connecting $ap1 to $ap2, and the type is eavesdropping, and the magnitude of the risk is medium as an attribute.

FIG. 12 shows an example of a configuration element type according to f the second example embodiment. The configuration element type according to the second example embodiment differs from the configuration element type according to the first example embodiment in that information about threats to be defended is added to the configuration element type according to the second example embodiment. In FIG. 12, components of the APs type are newly defined, and threats are specified for configuration elements included in the expected peripheral configuration. A threat which a developer of the configuration element type considers should defend is imposed on the definition of a configuration element type. Therefore, even when a user is not aware of a threat regarding the configuration element type, the user can also incorporate necessary information about the threat when the user incorporates the configuration element into configuration information.

FIG. 13 shows an example of a threat concretization rule. A threat according to the present disclosure may be represented in an abstract manner since it may be imposed on abstract configuration information. The threat concretization rule is a concretization rule that concretizes an abstract threat. For the threat concretization rule, either a concrete threat or a prior threat is specified in addition to a configuration which it is assumed is to be concretized. A concrete threat is specified in the threat concretization rule shown in FIG. 13. For the concretization target, a type of a threat to be concretized and a type of a configuration element on which a threat has been imposed are specified. For the assumed peripheral configuration, a peripheral configuration to be satisfied in advance when this threat concretization rule is applied is specified. For the concrete threat, another threat corresponding to a concrete method for realizing the threat to be concretized is specified. The prior threat will be described later with reference to FIG. 15.

A threat concretization rule 1-1 described in FIG. 13 shows that the eavesdropping of Http<AP, AP> can be realized by executing an eavesdropping command in the VM where the application which is the connection source of the Http<AP, AP> is hosted. That is, in the assumed peripheral configuration, a component vm of a certain VM type is defined, and the situation where $_src, which is the connection source of the above Http<AP, AP>, and $vm, which is the above vm, are connected by a HostedOn<*, VM> type relationship is shown. Further, for the concrete threat, the eavesdropping command in the above $vm is executed is shown.

Further, similarly, a threat concretization rule 1-2 described in FIG. 13 shows that the eavesdropping of Http<AP, AP> can be realized by executing an eavesdropping command in the VM where the application which is the connection destination of the Http<AP, AP> is hosted. In addition, the threat concretization rule 1-3 shows that the eavesdropping of Http<AP, AP> can be realized by eavesdropping on the communication between two different VMs where two applications which are the connection source and the connection destination of the Http<AP, AP> are hosted. As described above, it is possible to provide different concrete realization methods for the same threat.

Figure 14:
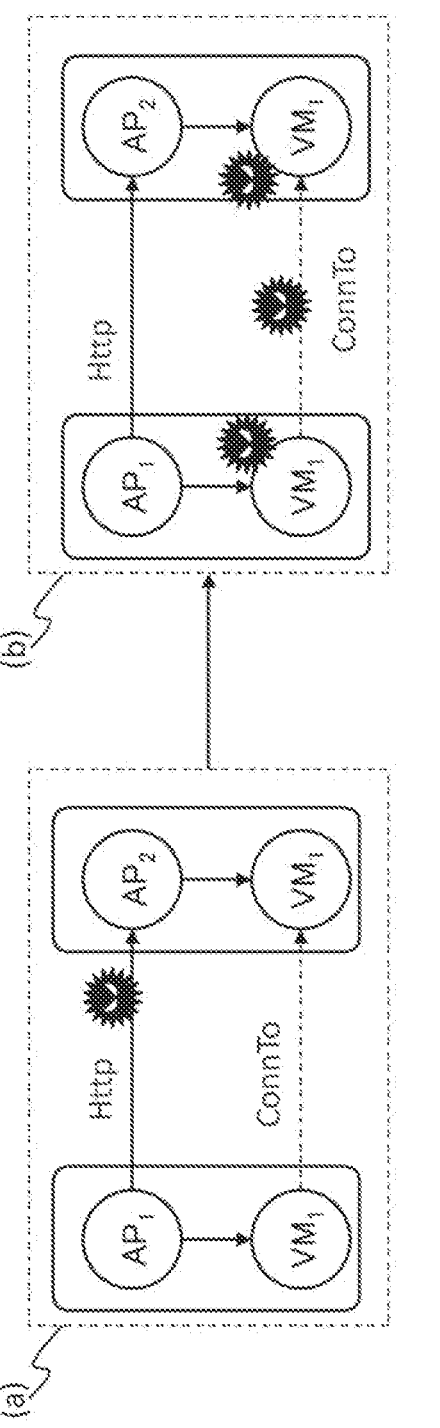
FIG. 14 is a diagram showing an example in which a threat is being concretized.

FIG. 14 shows an example in which a threat is being concretized by the threat concretization rule 1-1, the threat concretization rule 1-2, and the threat concretization rule 1-3. The threat imposed on Http<AP, AP> in the configuration draft (a) is replaced by three threats specified as concrete threats by the three threat concretization rules in the configuration draft (b). In a case of the concretization rule that concretizes a configuration element, when a plurality of concretization rules that concretize the same concretization target are defined, each of them is branched to configuration drafts different from each other, while in a case of the threat concretization rule, a plurality of concrete threats derived from one configuration draft are all imposed. Therefore, it is possible to, for each configuration draft, comprehensively verify all threats and select a secure configuration draft without loopholes.

FIG. 15 shows another example of the threat concretization rule. For the threat concretization rule shown in FIG. 15, a prior threat is specified. For the prior threat, work to be performed in advance to realize a threat to be concretized is defined.

The threat concretization rule 2 shown in FIG. 15 shows that, in order to execute the eavesdropping command in the component of the VM type, it is required to acquire the Root privilege in the above VM in advance. Note that the description of $_entity indicates that it refers to the configuration element in the concretization target of the threat concretization rule.

Further, a threat concretization rule 3-1 and a threat concretization rule 3-2 described in FIG. 15 indicate that, in order to acquire the Root privilege in the component of the VM type, the existence of an attacker corresponding to a network domain to which the VM belongs is required in advance. The threat concretization rule 3-1 is a rule that assumes a situation in which the above VM belongs to an internal domain, and it specifies the existence of an internal attacker as a prior threat. Further, the threat concretization rule 3-2 is a rule that assumes a situation in which the above VM belongs to an external domain, and it specifies the existence of an external attacker as a prior threat.

Figure 16:
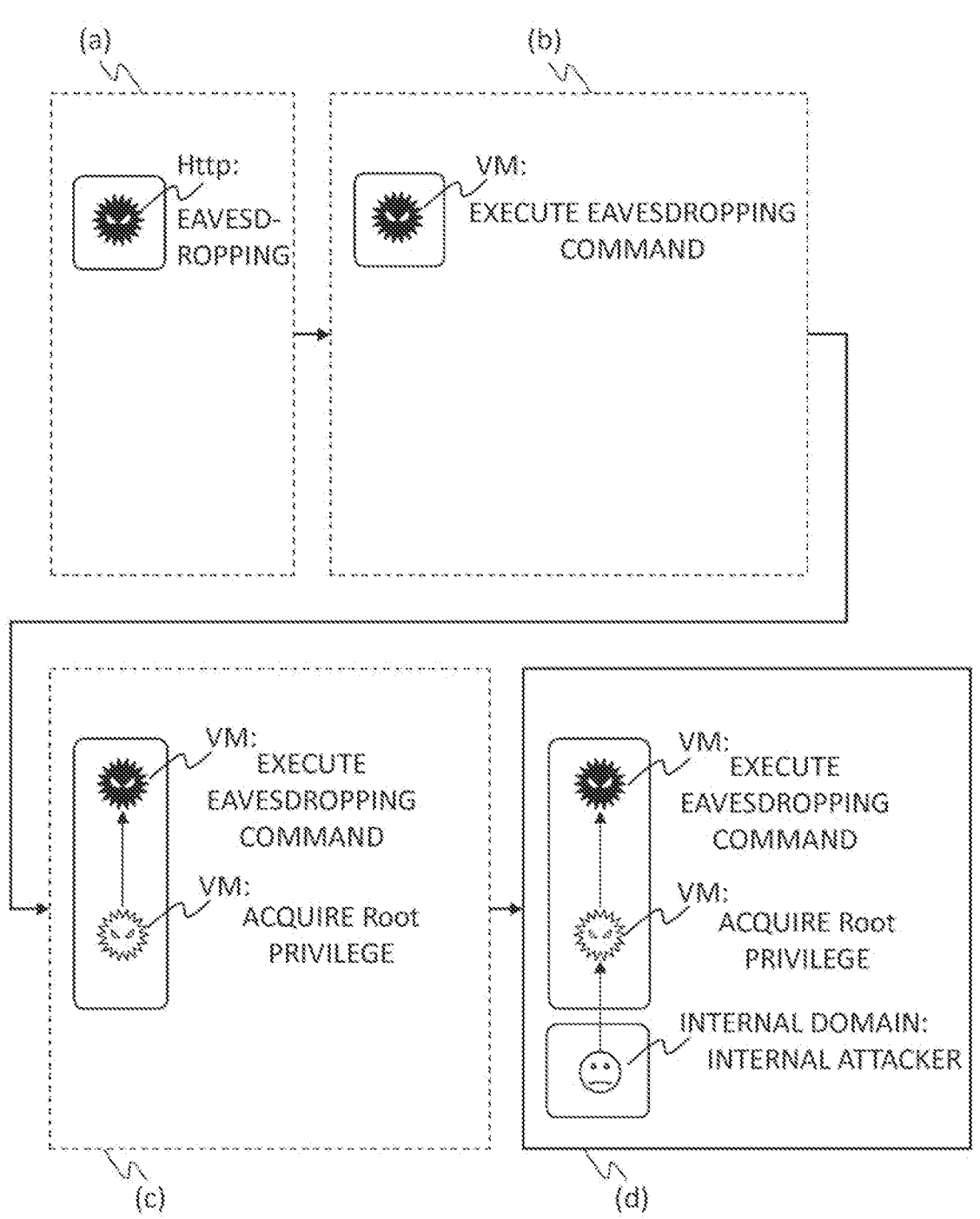
FIG. 16 is a diagram showing an example in which a threat is being concretized.

FIG. 16 shows an example in which a threat is being concretized by the threat concretization rule in a stepwise manner. First, (b) is generated by applying the threat concretization rule 1-1 or 1-2 described in FIG. 13 to (a), and the eavesdropping of Http is concretized to the execution of an eavesdropping command in the VM and replaced. Next, (c) is generated by applying the threat concretization rule 2 described in FIG. 15 to (b), and acquisition of the Root privilege in the above VM is assigned as prior work. Further, (d) is generated by applying the threat concretization rule 3-1 described in FIG. 15 to (c), and an internal attacker in the internal domain is assigned as a prior assumption of the above acquisition of the Root privilege.

The threats of the eavesdropping on Http, the execution of the eavesdropping command, the acquisition of the Root privilege, and the internal attacker appearing in the example shown in FIG. 16 can be interpreted as threats of different positions. The eavesdropping on Http and the execution of the eavesdropping command are threats specified to be directly defended in system requirements and configuration element types, and correspond to targets of an attack that should not be realized. The acquisition of the Root privileges is an action that, when realized, does not pose a threat in nature. However, it corresponds to preparatory work for achieving a target of an attack. Further, an internal attacker corresponds to the origin of an attack. A path from the origin of an attack to the target of an attack through any number of pieces of preparatory work is referred to as an attack path, and it can be evaluated that a threat is actually realized when the attack path is established. Note that, although only one attack path is illustrated in FIG. 16, a plurality of attack paths may be generated in one configuration draft, and when at least one attack path is established, the configuration draft may be evaluated as being insecure.

It is required to define which threat is regarded as being the origin of an attack in some way in advance, and it may be determined by, for example, the security level specified by a user and a definition of a security level illustrated in FIG. 17.

FIG. 17 shows a definition example of the security level. In FIG. 17, three security levels from a level 1, which is tolerant to security, to a level 3, which is strict to security, are defined. For each security level, an assumed origin of an attack and an acceptable risk are specified. In the security levels 1 and 2, it is assumed that only an external attacker is the origin of an attack, and the existence of an internal attacker is ignored. Meanwhile, in the security level 3, it is assumed that both external and internal attackers are the origins of an attack, and a stronger security is required. Further, the security level 1 accepts a medium risk, the security level 2 accepts only a small risk, and the security level 3 does not accept any risk. Note that the information shown in FIG. 17 is stored in the storage unit 104.

Figure 18:
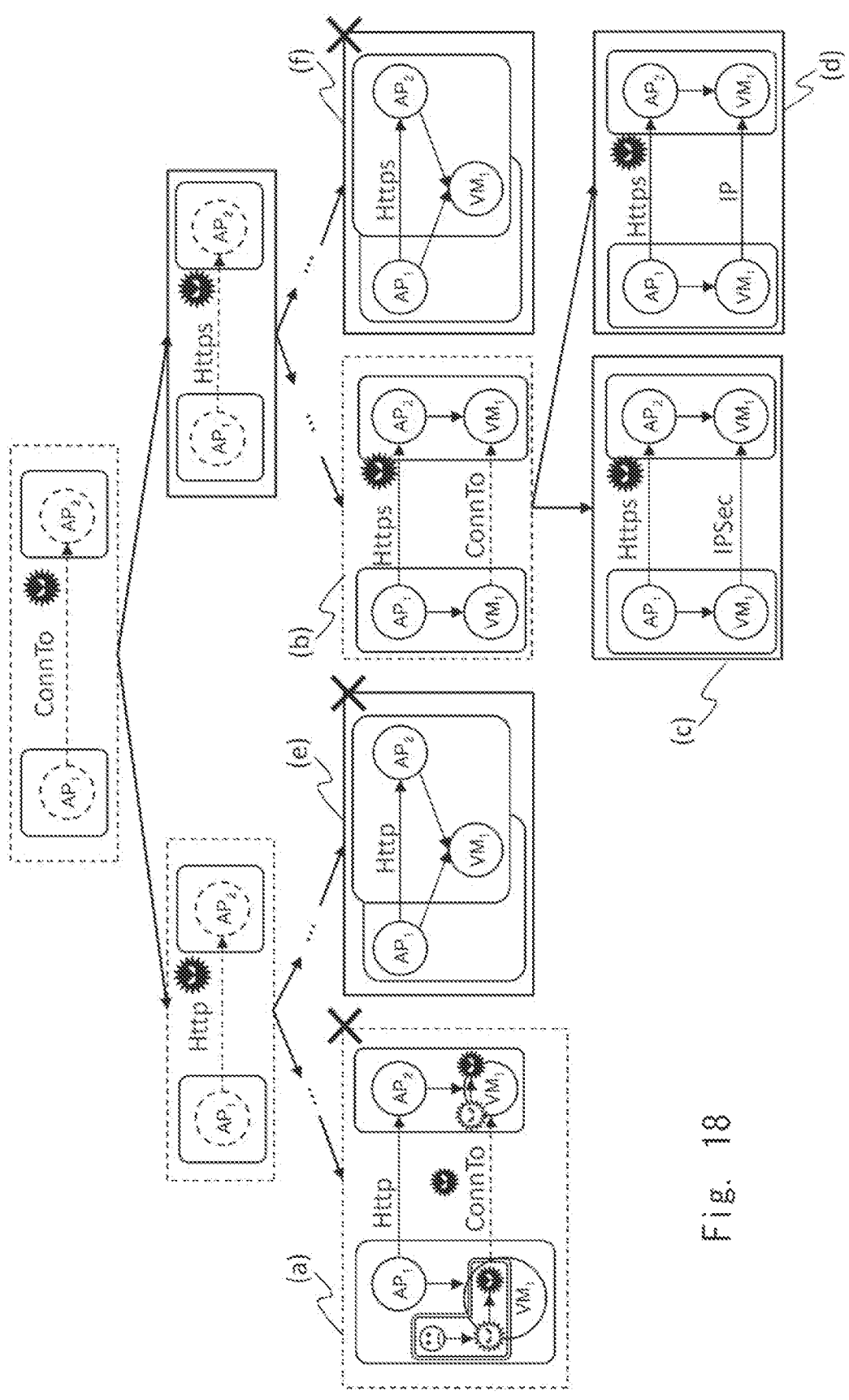
FIG. 18 is a diagram showing an example in which a configuration draft is being selected based on an evaluation of security.

FIG. 18 shows an example in which a configuration draft is being generated and selected based on an evaluation of security. It is assumed here that a user specifies the level 2 as a security level. That is, a user assumes only an external attacker as the origin of an attack, and accepts only a small risk. The eavesdropping of ConnTo<AP, AP> specified in the system requirement is recognized as being a threat to be defended since it is a medium risk. Since the threat is inherited even when the configuration element is concretized, the eavesdropping of ConnTo<AP, AP> is carried on to the eavesdropping of Http and the eavesdropping of Https. In the configuration draft (a), since the attack path is established, the configuration draft is evaluated as being insecure, and the subsequent concretizations are canceled. For the eavesdropping on Https, no specific means for realizing it has been defined. Thus, the attack path is not generated and the configuration drafts (b), (c), and (d) are generated sequentially. Here, the fully concretized configuration draft (c) or (d) is output as a system configuration.

Note that, although the following is outside the scope of the present disclosure, configuration drafts (e) and (f) shown in FIG. 18 are rejected for reasons other than security. In the second example embodiment, it is assumed that both of the configuration elements of the AP type and the VM type belong to the configuration elements of a Domain type, that is, they are connected by a JoinIn<*, Domain> type relationship. It is expected here that a certain configuration element ap1 of the AP type and the configuration element vm1 of the VM type in which the above ap1 is hosted belong to the same Domain. Therefore, when a configuration element belonging to a certain Domain is hosted by another configuration element, a constraint condition indicating that the above other hosting configuration element has to also belong to the above domain is defined. Further, it is assumed that the above constraint condition is imposed on the system requirement in the second example embodiment and the concretization of the system requirement is implemented while rejecting the configuration that does not satisfy the above constraint condition. In the configuration drafts (e) and (f), since the configuration elements of the $AP_1$ type and $AP_2$ type are hosted by the same configuration element vm1 of the VM type, the vm1 belongs to two domains. In the second example embodiment, it is further assumed that there is a constraint that one configuration element of the VM type can belong to only one domain, and this constraint is inconsistent with the above constraint. As a result, the configuration drafts (e) and (f) are rejected.

Next, an example of a Graphical User Interface (GUI) screen displayed on a terminal of a user by the input/output unit 101 according to the second example embodiment will be described.

Figure 19:
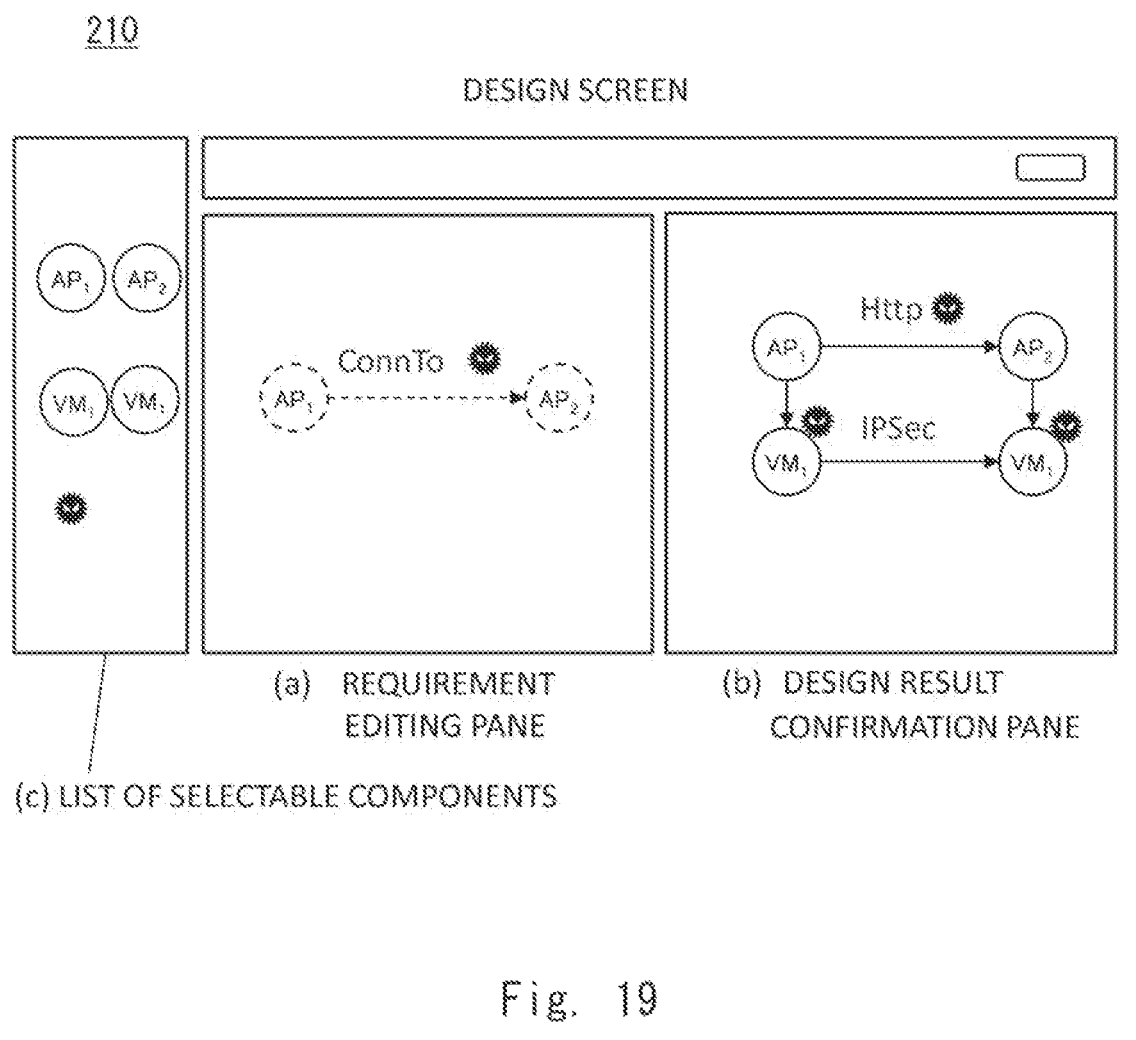

FIG. 19 shows an example of a design screen 210. In FIG. 19, "Requirement editing pane" in the configuration draft (a) is an area for a user to edit a system requirement. In "List of selectable components" in the configuration draft (c), a list of components such as configuration elements and threats that are selectable by a user are displayed. A user selects a desired component from among the components listed in the configuration draft (c) and edits the system requirement. In this way, a user can edit the system requirement while selecting a desired threat to be considered in the system requirement. Note that the threat is displayed as a virus icon. A system configuration obtained by concretizing the system requirement in the configuration draft (a) in a stepwise manner is displayed on "Design result confirmation pane" in the configuration draft (b).

Figure 20:
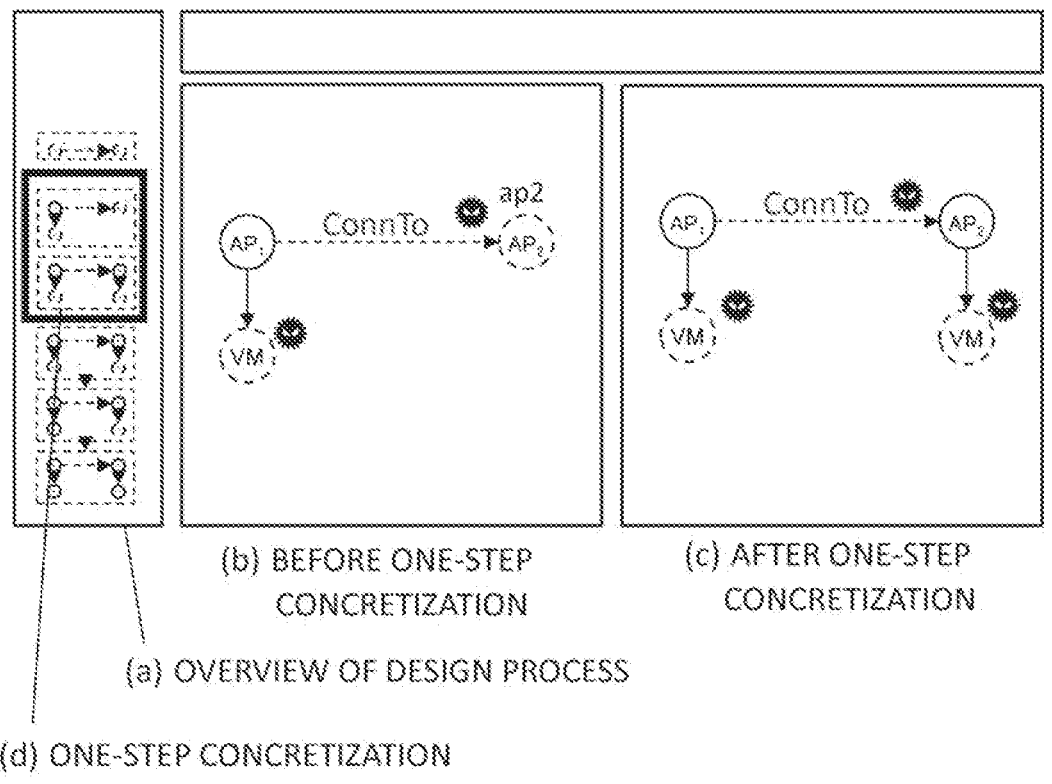
FIG. 20 is a diagram showing an example of a design process confirmation screen.

FIG. 20 shows an example of a design process confirmation screen 220. In FIG. 20, "Overview of the design process" in the configuration draft (a) shows a list of the system requirements, the configuration drafts obtained by the concretization at each step, and the final system configuration as forms of the concretization at each step of the above-described design processing performed by the secure system automatic design apparatus 200. A user can select configuration information before and after the concretization of a desired one-step concretization from among the configuration draft (a). In "One-step concretization" in the configuration draft (d), a form of the concretization in a certain step selected by a user is shown among the above forms of the concretization at each step. In "Before one-step concretization" in the configuration draft (b), configuration information before the one-step concretization selected by a user is shown. In "After one-step concretization" in the configuration draft (c), configuration information after the one-step concretization selected by a user is shown. Thus, a user can review the design process of a threat and confirm the concretization process thereof. Therefore, when the design is not secure, the user can confirm the cause thereof. Further, the input/output unit 101 may display the design process confirmation screen 220 shown in FIG. 20 when the configuration information concretization unit 103 cannot at least determine the option to be branched.

Next, operations of the second example embodiment will be described.

Figure 21:
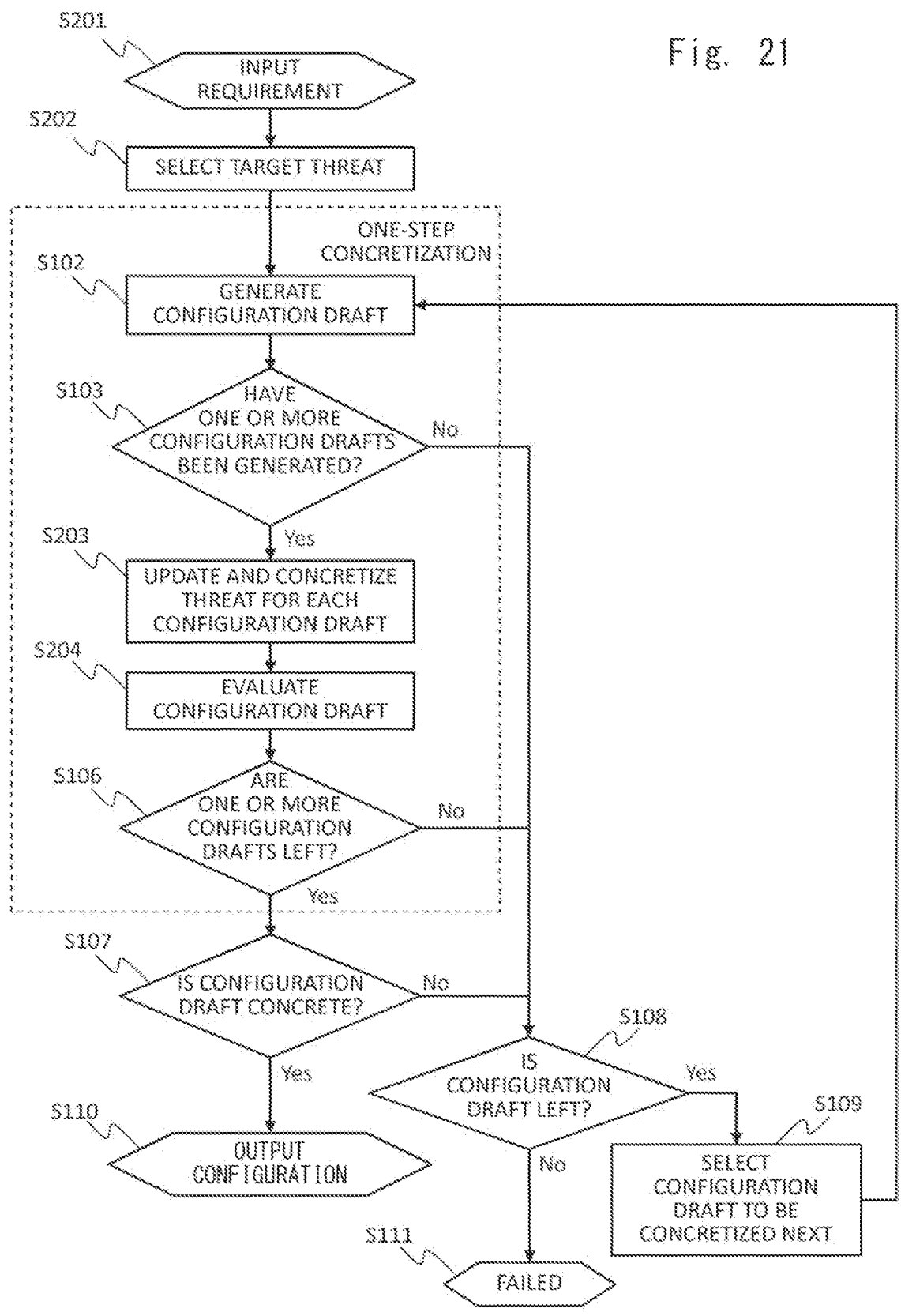
FIG. 21 is a flowchart showing an example of operations performed by the secure system automatic design apparatus according to the second example embodiment.

FIG. 21 is a flowchart showing an example of operations performed by the secure system automatic design apparatus 200 according to the second example embodiment. Steps similar to those in the first example embodiment are denoted by symbols similar to those in the first example embodiment and the descriptions thereof will be omitted.

First, the configuration information concretization unit 103 receives an input of a system requirement including specification of a threat and a security level required by a user from a terminal of the user though the input/output unit 101 (S201). Next, the configuration information concretization unit 103 selects, from among threats in the system requirement, a threat in which the magnitude of the risk is greater than that of the acceptable risk corresponding to the security level specified by the user is specified as a target threat (S202). Information required to determine the risk corresponding to the security level (e.g., information shown in FIG. 17) is stored in the storage unit 104, and the configuration information concretization unit 103 reads it from the storage unit 104. Although the following steps are generally similar to those of the above first example embodiment, only processing for updating and concretizing the threat for each configuration draft (S203) and processing for evaluating the configuration draft (S204) are different from those of the above first example embodiment.

In S203, first, when any new configuration element added to the configuration draft generated in S102 are present, the configuration information concretization unit 103 checks the type of the newly added configuration element, and when a thread is specified, the configuration information concretization unit 103 imposes the threat on it. Information of the configuration element type required to determine whether or not a threat is specified is stored in the storage unit 104 (e.g., information shown in FIG. 12), and the configuration information concretization unit 103 reads it from the storage unit 104. Further, the configuration information concretization unit 103 passes each of the configuration drafts generated in S102 to the threat information concretization unit 201, and the threat information concretization unit 201 repeats the processing for applying all applicable threat concretization rules to each of the threats present in the configuration draft until the applicable threat concretization rules are no longer present, thereby concretizing and generating the attack path as much as possible. Information about the threat concretization rules (e.g., information shown in FIGS. 13 and 15) is stored in the storage unit 104, and the threat information concretization unit 201 reads it from the storage unit 104.

In S204, the configuration information concretization unit 103 passes the configuration draft and the information about the security level specified by a user to the security evaluation unit 102 in order to evaluate the configuration draft, and receives a result of the evaluation. The security evaluation unit 102 checks whether or not an attack path from the origin of the attack that is determined in accordance with the specified security level to the threat included in the configuration draft (i.e., the threat specified by the system requirement and the configuration element type) is established. When the attack path is established, the security evaluation unit 102 evaluates that it is not secure, while when the attack path is not established, the security evaluation unit 102 evaluates that it is secure. Information required to determine the origin of the attack corresponding to the security level (e.g., information shown in FIG. 17) is stored in the storage unit 104, and the security evaluation unit 102 reads it from the storage unit 104.

Note that, in the above description, regarding the evaluation of the configuration draft, only a binary evaluation as to whether or not a specific condition is satisfied is used. However, for example, when an evaluation based on continuous values such as performance value and cost can be used, it can be expected that the configuration drafts to be concretized will be narrowed down with the focus on configuration drafts having higher evaluation values and the efficiency of design will be improved. Therefore, the degree of security can also be evaluated in the evaluation of security. For example, a point corresponding to the magnitude of the threat may be set as 1 for small, 2 for medium, and 3 for large, and the sum of the points of established threats may be set as the magnitude of a threat, and the reciprocal may be set as an evaluation value of security. Alternatively, based on the length of the attack path and the number of attack paths, a value such that the magnitude of the threat increases as the number of long paths increases is set, and the reciprocal may be used as an evaluation value of security.

According to the second example embodiment, it can be expected that the configuration information concretization unit 103 immediately rejects a configuration draft in which the establishment of the attack path is clarified by the security evaluation unit 102, and thus can omit subsequent concretizations and efficiently derive a secure system.

Third Example Embodiment

Next, a configuration of a third example embodiment will be described.

Figure 22:
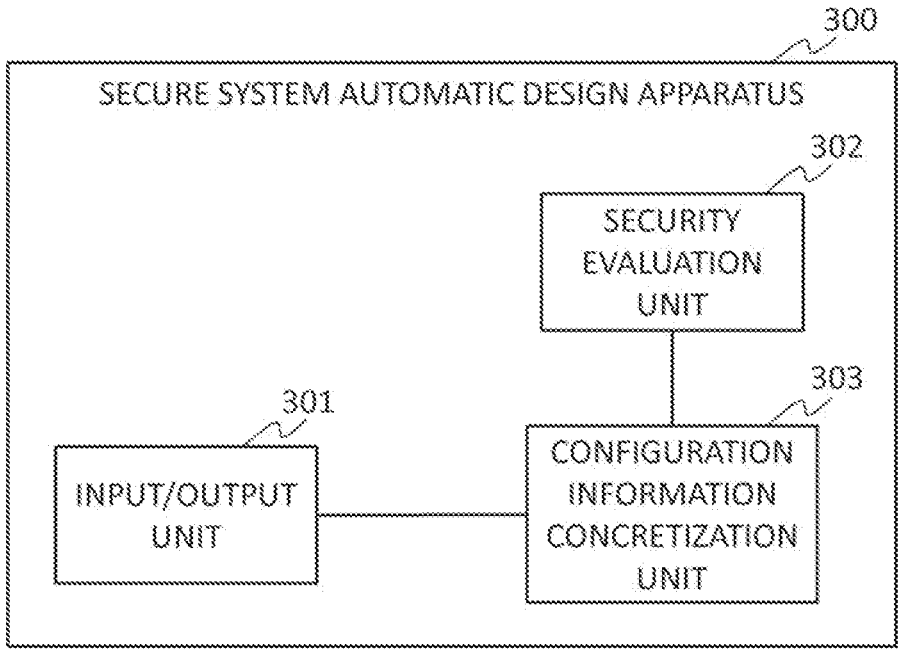
FIG. 22 is a schematic block diagram showing a functional configuration example of a secure system automatic design apparatus according to a third example embodiment.

FIG. 22 is a schematic block diagram showing a functional configuration example of a secure system automatic design apparatus 300 according to the third example embodiment. The third example embodiment corresponds to an example embodiment in which the concepts of the first and the second example embodiments described above are broadened.

As shown in FIG. 22, the secure system automatic design apparatus 300 includes an input/output unit 301, a security evaluation unit 302, and a configuration information concretization unit 303. The input/output unit 301, the security evaluation unit 302, and the configuration information concretization unit 303 correspond to the input/output unit 101, the security evaluation unit 102, and the configuration information concretization unit 103, respectively.

The input/output unit 301 receives an input of a system requirement and outputs a system configuration.

The configuration information concretization unit 303 converts the system requirement into the system configuration through a plurality of concretization procedures.

The security evaluation unit 302 evaluates security of the system configuration.

Note that, in each of the concretization procedures, the configuration information concretization unit 303 generates a plurality of configuration drafts, each of the configuration drafts being configuration information that is being converted and each of the configuration drafts being branched to a plurality of options of a concretization method.

The security evaluation unit 302 also evaluates security of each of the configuration drafts generated through the respective procedures.

The configuration information concretization unit 303 determines the option to be branched based on a result of the evaluation of each of the configuration drafts by the security evaluation unit 302.

According to the third example embodiment, the configuration information concretization unit 303 determines the option based on a result of the evaluation of the security of each of the configuration drafts by the security evaluation unit 302. Therefore, it is possible to immediately reject a configuration draft which it is clarified is not secure, omit subsequent concretizations, and efficiently derive a secure system.

Note that the secure system automatic design apparatus 300 may further include a storage unit that stores information about a configuration element of the system. This storage unit corresponds to the storage unit 104. Further, information about a vulnerability of the configuration element may be added to the information about the configuration element stored in the storage unit. For each of the configuration drafts, the security evaluation unit 302 may evaluate security of the configuration draft based on a vulnerability of each of the configuration elements included in the configuration draft.

Further, the input/output unit 301 may further receive an input of information about a risk to be considered at design time. The security evaluation unit 302 may evaluate the security of the configuration draft based on the vulnerability of each of the configuration elements included in the configuration draft and a vulnerability corresponding to the input risk.

Further, the secure system automatic design apparatus 300 may further include a threat information concretization unit that concretizes information about an attack path which is a path from the origin of an attack to a target of the attack. This threat information concretization unit corresponds to the threat information concretization unit 201. For each of the configuration drafts, the threat information concretization unit may concretize information about one attack path or a plurality of the attack paths to be defended based on a content of the configuration draft. For each of the configuration drafts, the security evaluation unit 302 may evaluate the security of the configuration draft based on the concretized content of the attack path.

Further, the input/output unit 301 may further receive an input of information about a level of security to be considered at design time. For the configuration draft, the security evaluation unit 302 may further evaluate a level of a risk when an attack has occurred and a frequency of occurrence of an attack, select an attack to be considered based on the input level of security, the level of the risk when an attack has occurred, and the frequency of occurrence of an attack, and evaluate the security of the configuration draft based on the selected attack.

Further, the input/output unit 301 may include a user interface that enables editing of a configuration element included in the system requirement and a threat imposed on the configuration element. Further, when the configuration information concretization unit 303 cannot at least determine the option to be branched, the input/output unit 301 may include a user interface that enables a user to edit a specific option to be branched and a desired concretization procedure among the plurality of concretization procedures.

Fourth Example Embodiment

Next, a configuration of a fourth example embodiment will be described.

Figure 23:
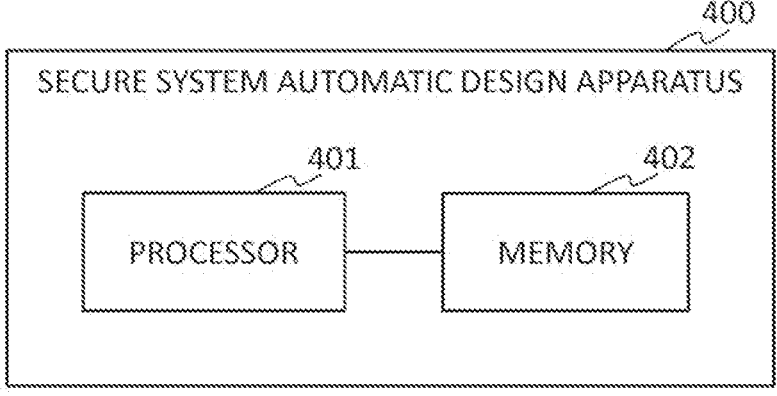
FIG. 23 is a schematic block diagram showing an example of a hardware configuration of a secure system automatic design apparatus according to a fourth example embodiment.

FIG. 23 is a schematic block diagram showing an example of a hardware configuration of a secure system automatic design apparatus 400 according to the fourth example embodiment.

As shown in FIG. 23, the secure system automatic design apparatus 400 includes a processor 401 and a memory 402.

The processor 401 may be, for example, a microprocessor, a Micro Processing Unit (MPU), or a Central Processing Unit (CPU). The processor 401 may include a plurality of processors.

The memory 402 is composed of a combination of a volatile memory and a non-volatile memory. The memory 402 may include a storage located separately from the processor 401. In this case, the processor 401 may access the memory 402 via an Input/Output (I/O) interface (not shown).

Each of the secure system automatic design apparatuses 100 to 300 according to the above first to third example embodiments may have the hardware configuration shown in FIG. 23. A program is stored in the memory 402. This program includes instructions (or software codes) that, when loaded into a computer, cause the computer to perform one or more of the functions described in the above example embodiments. The input/output units 101 and 301, the security evaluation units 102 and 302, the configuration information concretization units 103 and 303, and the threat information concretization unit 201 included in the above secure system automatic design apparatuses 100 to 300 may be implemented by having the processor 401 load a program stored in the memory 402 and execute it. Further, the storage unit 104 included in the above secure system automatic design apparatuses 100 to 300 may be implemented by the memory 402.

Further, the above program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the present disclosure has been described with reference to the example embodiments, the present disclosure is not limited to the above example embodiments. Various changes that may be understood by those skilled in the art may be made to the configurations and details of the present disclosure within the scope of the present disclosure.

REFERENCE SIGNS LIST 100, 200, 300, 400 SECURE SYSTEM AUTOMATIC DESIGN APPARATUS
101, 301 INPUT/OUTPUT UNIT
102, 302 SECURITY EVALUATION UNIT
103, 303 CONFIGURATION INFORMATION CONCRETIZATION UNIT
104 STORAGE UNIT
201 THREAT INFORMATION CONCRETIZATION UNIT

40 PROCESSOR
402 MEMORY

What is claimed is:

1. A secure system automatic design apparatus comprising:
   at least one memory configured to store instructions,
   an input/output interface configured to receive an input of a system requirement and output a system configuration;
   a first processor configured to execute the instructions to convert the system requirement into the system configuration through a plurality of concretization procedures;
   a second processor configured to execute the instructions to evaluate security of the system configuration, wherein
   in each of the concretization procedures, the first processor is configured to execute the instructions to generate a plurality of configuration drafts, each of the configuration drafts being configuration information that is being converted and each of the configuration drafts being branched to a plurality of options of a concretization method,
   the second processor is configured to execute the instructions to also evaluate security of each of the configuration drafts generated through the respective procedures, and
   the first processor is configured to execute the instructions to determine the option to be branched based on a result of the evaluation of each of the configuration drafts by the second processor; and
   a third processor configured to execute the instructions to concretize information about an attack path, the attack path being a path from the origin of an attack to a target of the attack, wherein
   for each of the configuration drafts, the third processor is configured to execute the instructions to concretize information about one attack path or a plurality of the attack paths to be defended based on a content of the configuration draft, and
   for each of the configuration drafts, the second processor is configured to execute the instructions to also evaluate the security of the configuration draft based on the concretized content of the attack path.

2. The secure system automatic design apparatus according to claim 1, wherein
   the at least one memory is configured to further store information about a configuration element of a system,
   information about a vulnerability of the configuration element is added to the information about the configuration element stored in the at least one memory, and
   for each of the configuration drafts, the second processor is configured to execute the instructions to evaluate the security of the configuration draft based on a vulnerability of each of the configuration elements included in the configuration draft.

3. The secure system automatic design apparatus according to claim 2, wherein
   the input/output interface is configured to further receive an input of information about a risk to be considered at design time, and
   the second processor is configured to execute the instructions to evaluate the security of the configuration draft based on the vulnerability of each of the configuration elements included in the configuration draft and a vulnerability corresponding to the input risk.

4. The secure system automatic design apparatus according to claim 1, wherein the input/output interface is configured to further receive an input of information about a level of security to be considered at design time, and for the configuration draft, the second processor is configured to execute the instructions to further evaluate a level of a risk when an attack has occurred and a frequency of occurrence of an attack, the second processor is configured to execute the instructions to select an attack to be considered based on the input level of security, the level of the risk when an attack has occurred, and the frequency of occurrence of an attack, and the second processor is configured to execute the instructions to evaluate the security of the configuration draft based on the selected attack.

5. The secure system automatic design apparatus according to claim 1, wherein the input/output interface includes a user interface configured to enable editing of a configuration element included in the system requirement and a threat imposed on the configuration element.

6. The secure system automatic design apparatus according to claim 1, wherein when the first processor is not able to at least determine the option to be branched, the input/output interface includes a user interface configured to enable a user to edit a specific option to be branched and a desired concretization procedure among the plurality of concretization procedures.

7. A secure system automatic design method performed by a secure system automatic design apparatus, the secure system automatic design method comprising:

a first step of receiving an input of a system requirement;

a second step of converting the system requirement into a system configuration through a plurality of concretization procedures including concretizing information about an attack path, the attack path being a path from the origin of an attack to a target of the attack;

a third step of evaluating security of the system configuration; and a fourth step of outputting the system configuration, wherein in the second step, in each of the concretization procedures, a plurality of configuration drafts are generated, each of the configuration drafts being configuration information that is being converted and each of the configuration drafts being branched to a plurality of options of a concretization method, security of each of the configuration drafts generated through the respective procedures is also evaluated, and the option to be branched is determined based on a result of the evaluation of each of the configuration drafts, wherein, for each of the configuration drafts concretizing information about one attack path or a plurality of the attack paths to be defended based on a content of the configuration draft, and for each of the configuration drafts executing the instructions to also evaluate the security of the configuration draft based on the concretized content of the attack path.

8. A non-transitory computer readable medium storing a program to be executed by a computer, the program comprising:

a first procedure of receiving an input of a system requirement;

a second procedure of converting the system requirement into a system configuration through a plurality of concretization procedures including concretizing information about an attack path, the attack path being a path from the origin of an attack to a target of the attack;

a third procedure of evaluating security of the system configuration; and a fourth step of outputting the system configuration, wherein in the second procedure, in each of the concretization procedures, a plurality of configuration drafts are generated, each of the configuration drafts being configuration information that is being converted and each of the configuration drafts being branched to a plurality of options of a concretization method, security of each of the configuration drafts generated through the respective procedures is also evaluated, and the option to be branched is determined based on a result of the evaluation of each of the configuration drafts, wherein, for each of the configuration drafts concretizing information about one attack path or a plurality of the attack paths to be defended based on a content of the configuration draft, and for each of the configuration drafts executing the instructions to also evaluate the security of the configuration draft based on the concretized content of the attack path.

* * * * *